US011966880B2

(12) United States Patent
Willett et al.

(10) Patent No.: US 11,966,880 B2
(45) Date of Patent: Apr. 23, 2024

(54) POLICIES AND CONTROLS FOR BUILDING AND VALIDATING DATABASE SOFTWARE IN A SHARED MANAGEMENT ENVIRONMENT

(71) Applicant: Amazon Technologies, Inc., Seattle, WA (US)

(72) Inventors: Dallas Lamont Willett, Albuquerque, NM (US); Mostafa G. Ead, Vancouver (CA); Nitin Kumar Saxena, Bellevue, WA (US); Lakshman Potluri, Mill Creek, WA (US); Oleg Leizerov, West Vancouver (CA); Prudhvi Janga, Bothell, WA (US); Bharath Subramanian Pichai, Kirkland, WA (US); Timothy David Ebringer, Boulder, CO (US); Xin Zhao, Mercer Island, WA (US); Jason Denton, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 210 days.

(21) Appl. No.: 17/507,726

(22) Filed: Oct. 21, 2021

(65) Prior Publication Data

US 2023/0125754 A1 Apr. 27, 2023

(51) Int. Cl.
*G06Q 10/10* (2023.01)
*G06F 16/21* (2019.01)
(Continued)

(52) U.S. Cl.
CPC ......... *G06Q 10/103* (2013.01); *G06F 16/219* (2019.01); *G06Q 10/06313* (2013.01); *G06Q 10/0637* (2013.01)

(58) Field of Classification Search
CPC .............. G06Q 10/103; G06Q 16/219; G06Q 10/06313; G06Q 10/0637
(Continued)

(56) References Cited

FOREIGN PATENT DOCUMENTS

CA     2667172 C   *   1/2013   ........... G06F 21/629

OTHER PUBLICATIONS

"AWS Launch Wizard", User Guide, Amazon Web Services, Sep. 22, 2020, 62 pages.
(Continued)

*Primary Examiner* — John Q Chavis
(74) *Attorney, Agent, or Firm* — Nicholson De Vos Webster & Elliott LLP

(57) ABSTRACT

Techniques for building, validating, and utilizing custom database software in a shared management environment are described. A database customization service allows users to provide database installation files as part of a configuration to generate a custom database engine version. The creation of custom database engine versions may be governed by policy, and the database customization service may provide recommendations for creating custom database engine versions according to various criteria. The custom database engine version can be built, and its functionality and correctness verified. Users may launch database instances using these custom database engine versions that can be managed under a shared management scheme where both users and the database customization service can perform host-level management.

20 Claims, 15 Drawing Sheets

(51) Int. Cl.
    *G06Q 10/0631*    (2023.01)
    *G06Q 10/0637*    (2023.01)

(58) Field of Classification Search
    USPC .......................................................... 717/102
    See application file for complete search history.

(56) References Cited

OTHER PUBLICATIONS

Abourezq, M., et al., "Database-as-a Service for Big Data: An Overview", International Journal Of Advanced Computer Science And Applications, vol. 7, No. 1, Jan. 1, 2016, pp. 157-177.
Anonymous: "Amazon Relational Database Service User Guide Amazon Relational Database Service: User Guide", Aug. 16, 2021, pp. 1-345.
Dalbhanjan Peter, "Overview of Deployment Options on AWS", Amazon Web Services, Mar. 1, 2015, 23 pages.
International Search Report and Written Opinion, PCT App. No. PCT/US2022/047109, dated Feb. 10, 2023, 14 pages.
Markwardt Kevin: "Ansible and AWS automation : Official Pythian Blog", Jul. 31, 2021, pp. 1-25.
Sajee Matthew: "Overview of Amazon Web Services", AWS Whitepaper, Amazon Web Services, Jun. 29, 2021, 72 pages.

\* cited by examiner

DATABASE CUSTOMIZATION SERVICE

CUSTOM DATABASE ENGINE VERSIONS

| VIEW CUSTOM DB ENGINE VERSIONS | CREATE CUSTOM DB ENGINE VERSION |

CREATE A NEW CUSTOM DB ENGINE VERSION

*ENGINE TYPE*

- EDITION: BIGDATABASE ENTERPRISE EDITION
- MAJOR VERSION: BIGDATABASE 26X

*VERSION DETAILS*

- CUSTOM DB ENGINE VERSION NAME: BIGDATABASE-VERSION-FOR-ERP
- DESCRIPTION: OUR COMPANYX CUSTOM BIGDATABASE INSTALL FOR USE WITH OUR ERP PACKAGE

*FILES*

- INSTALLATION FILES LOCATION: STORAGE://MY-FILES/2345/V1/
- MANIFEST LOCATION: STORAGE://MY-FILES/2345/V1-MANIFEST/

*COMPUTE INSTANCE(S)*

- INSTANCE TYPE: NORMAL.R1.XLARGE
- OPERATING SYSTEM: LINUX ENTERPRISE SERVER 15
- O/S CONFIGURATION: CUSTOM

☑ SAME FOR BUILD AND VALIDATION?

[CANCEL] [CREATE]

REGION-US-EAST  USER: RSINGH  COMPANY-X

//* POLICIES AND CONTROLS FOR BUILDING AND VALIDATING DATABASE SOFTWARE IN A SHARED MANAGEMENT ENVIRONMENT

BACKGROUND

Many companies and other organizations operate computer networks that interconnect numerous computing systems to support their operations, such as where computing systems are co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

Many public data center operators, such as service providers who operate service provider networks, offer their customers a variety of computing-related resources as services. For example, one popular set of services involve databases, where customers may utilize various types of databases such as relational databases often used by for transactional applications, non-relational databases for internet-scale applications, data warehouses for analytics tasks, in-memory data stores for caching and/or real-time workloads, graph databases for building applications with highly-connected data, time series databases for measuring changes over time, ledger databases to maintain a complete and verifiable record of transactions, etc.

Relational databases, which model data as rows and columns in a series of tables, have long been a popular form of data organization and storage. However, service provider networks and other applications have made it increasingly easy for developers to use a wide variety of other types of data stores across their software applications and systems. Examples of such alternative data store types include object storage services (which can store files of virtually any file type and format), non-relational databases, data warehouses, and the like. While a particular relational database can provide optimal storage and querying performance in some contexts, the characteristics of other such data stores (or even types/implementation of relational databases) can improve scalability and performance for other use cases. The ability to readily integrate different types of data stores into software applications and systems has led to an increasing use of multiple types of data stores depending on the particular performance, durability, availability, scalability, security, and other considerations related to each subset of data to be stored and used by an application.

BRIEF DESCRIPTION OF DRAWINGS

Various embodiments in accordance with the present disclosure will be described with reference to the drawings, in which:

FIG. 3 is a diagram illustrating an exemplary graphical user interface useful for custom database engine creation according to some embodiments.

FIG. 9 is a diagram illustrating an exemplary graphical user interface including recommendations during custom database engine creation according to some embodiments.

DETAILED DESCRIPTION

Figure 1:
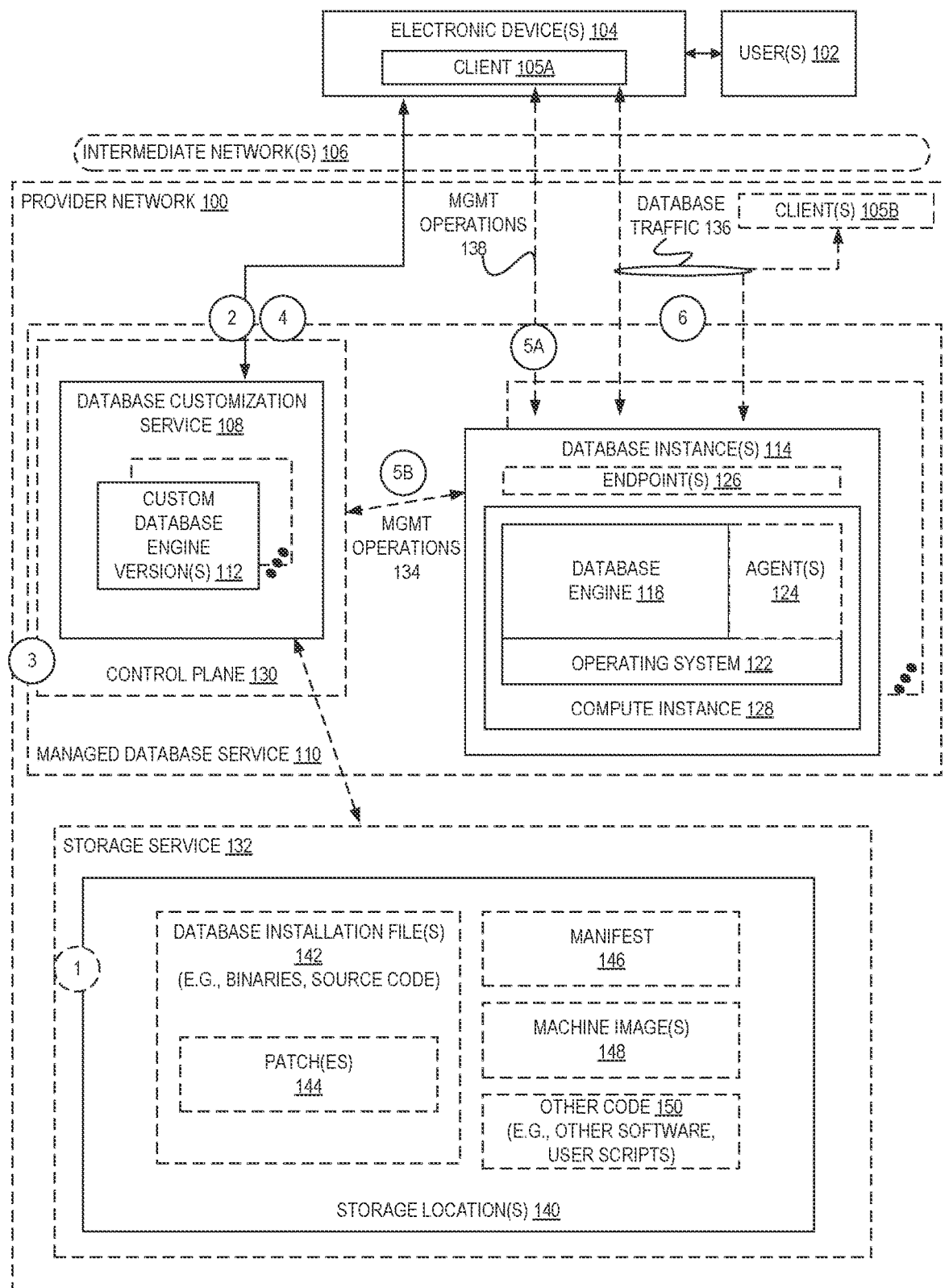
FIG. 1 is a diagram illustrating an environment for building, validating, and utilizing custom database software in a shared management environment of a cloud provider network according to some embodiments.

The present disclosure relates to methods, apparatus, systems, and non-transitory computer-readable storage media for building, validating, and utilizing custom database software in a shared management environment. According to some embodiments, a database customization service is implemented in conjunction with a managed database service, allowing users the ability to customize the databases they wish to use, the underlying operating systems (OSs), and the supporting infrastructure, while continuing to allow the managed database service to provide a managed database experience by setting up, monitoring, and maintaining these databases and associated resources. Accordingly, the database customization service provides a powerful middleground between self-managed offerings, where users deploy their own databases on cloud-managed virtual machines (VMs), and fully managed offerings, where users are not provided the ability to customize or manage their underlying database resources.

Fully-managed database services are typically responsible for most or all management tasks in the databases of its users. For example, a managed database service may manage software patching, perform backups, implement automatic failure detection, recovery, and a host of other operations on behalf of its users.

To deliver a "managed" service experience, managed database services typically do not allow users to access the underlying host (e.g., a virtual machine and/or physical machine that execute the database server application) and may also restrict access to some procedures and objects provided by the database that require high-level privileges. Thus, managed database services typically prohibit their users from having direct access to the operating system hosting the database and/or many configuration settings of the database itself to ensure that the database instance remains in a safe, known state.

However, for some applications, users may need to perform operations as a privileged OS user. For example, a user might want to install custom database and/or OS patches and packages, configure specific database settings, configure file systems to share files directly with their applications, deploy database versions that are not (or are no longer) supported by the managed database service.

Typically, users with these specialized needs must thus resort to using other computing services/resources to meet their needs, such as by "self-hosting" a database using a virtual machine (or other computing environment) provided by a hardware virtualization service, self-hosting the database in the user's own on-premises environment or data center, etc. However, this requires the user to have substantial amounts of expertise, time, and resources available, as the user will be responsible for database management tasks such as operating system installation, database software installation, implementing scaling functionalities, ensuring high-availability, performing database backups, database software patching, operating system patching, and possibly (such as in self-hosted scenarios) server maintenance, hardware lifecycle management, and power, network, and cooling system implementation and management.

Moreover, when users manage their database software on their own, though they gain more control, their systems become more prone to failures and bugs due to user error. For example, when a user makes changes manually, the user might accidentally cause application downtime. Additionally, the user may spend hours checking every change to identify and fix an issue that arises.

To this end, embodiments disclosed herein provide a managed database service that automates common database administration (DBA) tasks but also supports privileged access to the database and underlying OS. In some embodiments, the managed database service can provide full responsibility for some tasks (e.g., server maintenance, hardware lifecycle management, and power, network, and cooling systems implementation and management) while providing a "shared" model allowing shared responsibility (between the users and the service) for other tasks, such as application optimization, scaling, high-availability, database backups, database software patching and/or installation, OS patching and/or installation, etc.

Accordingly, in some embodiments users can automate administrative tasks, such as managing lifecycle management of databases, including backups and high availability configurations; monitoring the health of these custom database instances and observing changes to the infrastructure, OS, and databases; and implementing notifications (or, taking action) for issues depending on disruption to the database instance. However, users may also have the ability to install third-party applications (e.g., custom applications and agents), install custom patches (e.g., custom database patches, one-off patches, modified OS packages), install non-supported database versions that are not supported natively by the managed database service, stage an on-premises database before moving it to a fully managed service, create custom automations (e.g., create, schedule, and execute custom automation scripts for reporting, management, or diagnostic tools), and more.

For example, embodiments disclosed herein allow user-access to a database instance's underlying host to enable customizations to the OS and database binaries, as well as provide super user privileges for debugging OS or database issues. When host access has been requested and granted, the instance may still be monitored by the managed database service, but some management features will be paused, such as recovery actions or administrative tasks like backups. This allows users to patch their OS or database or make other customizations to their database instance that may conflict with recovery actions or running tasks. User access to the host may be provided through a separate systems manager component, which audits and logs all the commands issued by the user. Once host level access is relinquished, the system can be validated to ensure it is still in a valid state for running a database instance, and recovery actions and administrative tasks can thereafter be re-enabled. Users may be notified of any issues that are caught as a result of the user's modifications, and system safeguards may attempt to fix any impacting issues and may notify the user of actions that the customer needs to take. In some embodiments, users may alternatively have direct access to the host, e.g., via a connection such as a Secure Shell (SSH) connection.

For further detail, FIG. 1 is a diagram illustrating an environment for building, validating, and utilizing custom database software in a shared management environment of a cloud provider network according to some embodiments. In FIG. 1, a database customization service 108 allows users (e.g., user 102) to build and/or utilize custom database engine versions 112A that can be used to launch database instances 114, which may be executed by a managed database service 110 of a provider network (or, by other entities in other locations, such as within an on-premises network of a user, in a third-party data center or provider network, etc.). In some embodiments, the managed database service 110 can run these "custom" database instances 114 created or defined by users 102 under a "shared" management approach where both users and the managed database service 110 can manage the instances—e.g., users may directly access and/or customize the database engines 118, operating system 122, or associated applications, while the managed database service 110 may similarly manage overlapping aspects (e.g., patching, updating, etc., of database engines and operating systems) and/or different, non-user accessible aspects (e.g., auto-scaling, physical hosts and resources). In some embodiments, the database customization service 108, managed database service 110, and/or other entities of the provider network 100 are implemented as software executed by one or more server computing devices in one—or typically multiple—geographic locations, such as within one or more zones or regions of a multitenant "cloud" provider network 100.

A provider network 100 provides users with the ability to use one or more of a variety of types of computing-related resources such as compute resources (e.g., executing virtual machine (VM) instances and/or containers, executing batch jobs, executing code without provisioning servers), data/ storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/ deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of provider networks 100 can use one or more user accounts that are associated with a customer account, though these terms can be used somewhat interchangeably depending upon the context of use. Users can interact with a provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane 130 of the provider network 100 that includes "backend" services supporting and enabling the services that are more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

To provide these and other computing services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code—typically without the user having any control of or knowledge of the underlying compute instance(s) involved.

One service that may be offered in a provider network 100 is a database service, such as a managed database service 110. The database service 110 may be implemented as one or more software modules executed by one or more computing devices of a provider network 100. The managed database service 110 may be "managed" and thus make it easy for users to set up, operate, and scale databases in the provider network 100 in the form of database instances 114 without needing to provision compute instances, install database software, configure the software, or the like. The database service 110 may rely on the virtualization techniques described above to allocate the compute and storage resources to provide a database instance 114. For example, the database service 120 may provision resources of one or more host devices (e.g., server computing devices) to host a database instance. The database service 110 may provide resizable capacity while managing time-consuming database administration tasks. The database service 110 may provide one or more of a variety of database engines 118 (e.g., relational database engines such as MySQL, MariaDB, Oracle™, SQL Server, PostgreSQL, etc., and/or non-relational database engines) allowing existing code, applications, and/or tools to work seamlessly. In some embodiments, the managed database service 110 may perform administrative tasks such as automatically backing up databases, upgrading and/or patching database software, scaling the compute resources or storage capacity associated with its database instances, etc.

A user 102 of the provider network 100 may interact with the database service 110 to launch and use one or more database instances 114. For example, the user 102 may utilize a console implemented via a web-based application to issue one or more requests to an endpoint associated with the database service 110 indicating the user's 102 desire to launch/configure one or more database instances 114. A database instance 114 may include a compute instance 128 (e.g., a virtual machine) having an operating system 122 and executing a database engine 118.

Each database engine has its own supported features, and each version of a database engine may include specific features. Additionally, each database engine has a set of parameters in a database parameter group that control the behavior of the databases that it manages Traditionally, database engines are implemented using tightly coupled architectures, where a database engine determines how data is stored and is further associated with a proprietary data storage format. Such database engines typically maintain a catalog that describes how the data is stored, for example, as a collection of tables, columns, and data types. These database engines further include a query engine that is configured to query the data using the catalog and knowledge of the proprietary data storage format.

Thus, a database instance may be viewed as an isolated database environment (e.g., running in the "cloud," meaning, running in service provider network) and may contain one or multiple user-created databases that can be accessed using the same client tools and applications typically used to access a standalone database instance. Each database instance may have a database instance identifier. In some embodiments, a database instance identifier is a user-supplied name that uniquely identifies the database instance (e.g., is unique for that user within a region) when interacting with the database service 110 (e.g., via API and/or CLI commands) The database instance identifier may be used as part of a DNS hostname allocated to the instance by the database service. For example, if a user specifies "db1" as the database instance identifier, the database service 110 may automatically allocate a DNS endpoint 126 for the instance, such as "db1.123456789012.usa-east-1.dbservice.example.com", where "123456789012" is a fixed identifier for a specific region for the user account. When creating a database instance, some database engines require that a database name be specified. A database instance can host multiple databases, or a single database from some vendors may have multiple schemas. The database name value may thus depend on the database engine.

In some embodiments, the managed database service 110 may support multiple different types (or classes of types) of database instance, where a type of database instance commonly refers to a particular combination of amounts and types of computing resources (e.g., processing capability such as a number of cores, memory, available bandwidth, etc.) of the associated compute instance 128. Multiple types of instance classes may be supported (e.g., standard, memory optimized, burstable performance, etc.), where each class may have multiple different types or sizes thereof. For example, a "standard" instance class may have multiple different instance types, e.g., "8XL" or "16XL", and each instance type of a same class may or may not support the same database engines or versions thereof (e.g., all versions of MariaDB, only versions of PostgreSQL less than version 13, etc.).

The compute instance 128 may also run one or more agents 124, e.g., to collect performance-related data (e.g., metrics) associated with the database engine 118, operating system 122, and/or compute instance 128 itself. In some embodiments, the database instance 114 is further associated with an endpoint 126 (e.g., associated with a network address) that can be used to access the database engine 118.

In response to the requests sent on behalf of the user, a management engine or controller (not illustrated, but belonging to the control plane 130) of the database service 110 may then perform operations to obtain compute resources (e.g., VMs executed by host device(s)) for the database instance(s) 114 within the provider network 100, launch VM images (optionally having code for the database pre-installed, optionally launch or install databases on the host device(s), configure the database instance 114, configure security rules and/or permissions used by the database instance(s) 114 or used for accessing the database instance(s) 114, etc. Thereafter, database client applications (e.g., an external client 105A and/or a client 105B within the provider network) may issue queries/statements to the database instance 114 (as database traffic 136) to read/write data from/to the database. Such database client applications may be executed by electronic devices inside of the provider network 100 (e.g., hosted on a virtual machine) or outside of the provider network 100 and interact with the database instance 114 via the network(s) 106 and/or endpoint(s) 126. In some embodiments, the transactions may be sent using HyperText Transfer Protocol (HTTP) messages to endpoint(s) associated with the database instance(s) 114 that provide an HTTP-based interface.

In embodiments disclosed herein, a managed database service 110 may include a database customization service 108 allowing users to define and create custom database engine versions (CDEVs) for particular databases the users wish to utilize, where the databases may be deemed "custom" as they may not be natively supported by the existing fully managed database offerings of the managed database service 110. The CDEVs may thereafter be used, by the user 102 or associated users (e.g., of a same organizational account, or even from a completely distinct user or account through sharing of CDEVs such as via a marketplace of CDEVs) to launch custom database instances 114 that can be jointly managed—e.g., by allowing the user direct access to the host while the managed database service 110 may also perform traditional management tasks. A CDEV may be formed in a variety of formats—for example, a CDEV may include a "snapshot" (e.g., a binary volume snapshot) taken of a database version and a machine image.

A machine image may be a master image for the creation of virtual servers—compute instances—in a provider network environment. A machine image may include (or reference) one or more volume snapshots or a template for the root volume of the instance (for example, an operating system, an application server, and applications). A machine image may also include launch permissions that control which provider network accounts can use the machine image to launch instances, and/or a block device mapping that specifies the volumes to attach to the instance when it is launched.

In some embodiments, a user 102 may begin the process of creating a CDEV by, as shown at circle (1), uploading database software in the form of database installation files 142 to a storage location 140 (e.g., a virtual folder/directory/bucket provided by a storage service 132 such as an object storage service). For example, a user may directly interact with a storage service 132 to upload files/data described herein; however, in other embodiments the users may indirectly upload this material to a storage service 132 via use of a console or other application provided by the database customization service 108, which itself may store it to one or more storage locations 140.

The upload may be performed into a storage location 140 associated with a same region of the provider network that is to be used to create the CDEV. The database installation file(s) 142 may be in an uncompressed form (e.g., uploaded file-by-file) or in a compressed or consolidated format (e.g., within a ZIP file, TAR file, or the like). The storage location(s) 140 may be within, for example, a folder or bucket owned/controlled by the user.

Figure 2:
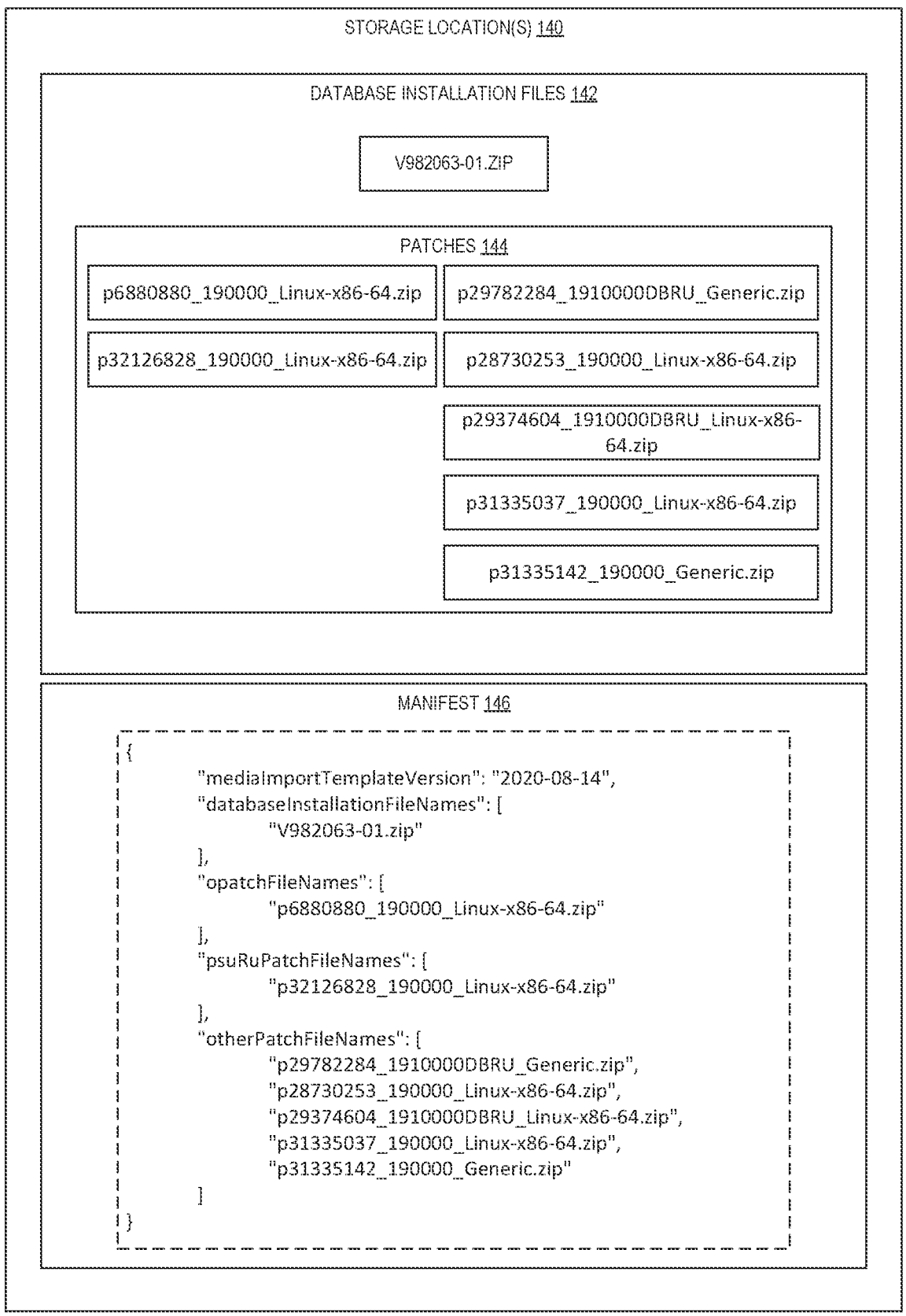
FIG. 2 is a diagram illustrating exemplary database installation files, a custom engine version manifest, and a set of database patches for use in building custom database software in a shared management environment of a cloud provider network according to some embodiments.

For example, FIG. 2 is a diagram illustrating exemplary database installation files, a custom engine version manifest, and a set of database patches for use in building custom database software in a shared management environment of a cloud provider network according to some embodiments. In FIG. 2, an example set of uploaded database installation file(s) 142 is provided as "V982063-01.ZIP", which may include a database binary or executable file, a set of source files that can be used to build an executable database engine, or the like. The database installation file(s) 142 also is shown with a set of patches 144 to be applied to the database engine, e.g., executed and/or built based on the use of V982063-01.ZIP. As used herein, the term "patch" may be broadly used to cover a variety of types of updates or changes to a software module, and may include code that fixes issues with other software (e.g., bug-fixes), adds additional code to software (e.g., installs new drivers), addresses new security vulnerabilities, addresses stability issues, upgrades existing software, or the like.

Turning back to FIG. 1, at circle (1) the user may additionally (or, alternatively) upload a user-defined manifest 146 for the CDEV. The manifest 146 may be a document (e.g., a formatted document such as a JSON file) that describes the installation files for the CDEV, e.g., including names of files, locations of files (e.g., URLs), or the like. The manifest 146 may also identify other configuration operations to be performed as part of the build (e.g., operating system and/or database engine configurations), identify other software to be installed (e.g., database extensions, third-party software) or run (e.g., a user-provided script), etc. The user may save the CDEV manifest as a file or edit a template when creating the CDEV using a console application provided by the database customization service 108. With reference again to FIG. 2, the example CDEV manifest 146 lists the files that were uploaded to the storage location, and the database customization service 108 builds the CDEV based on this information, applying the patches in the order in which they are listed. In this following example, the database customization service 108 will first create the database using the database installation file V982063-01.ZIP, and then apply patches in order, e.g., first "p32126828" (as indicated by "p6880880_190000_Linux-x86-64.zip" appearing as the next listed file), then "p32126828," and then "p29782284," and so on.

This example manifest is geared toward creating a custom Oracle type database engine, and thus includes fields and values specific to that engine; however, in other embodiments other types of databases, fields, etc., are used that may be generic or specific to a particular database engine. In this example manifest, the field "MediaImportTemplateVersion" provides a user-specified version of the CDEV manifest, here in a date format of YYYY-MM-DD." The field "databaseInstallationFileNames" provides an ordered list of installation files, and the field "opatchFileNames" (e.g., useful for constructing Oracle databases) provides an ordered list of OPatch installers used for the Oracle DB engine. The field "psuRuPatchFileNames" provides a similar ordered list of the Patch Set Update (PSU) patches (e.g., including security and/or regression fixes) and/or Release Update (RU) patches, while the field "OtherPatchFileNames" provides other patches, e.g., that are not in the list of PSU and RU patches, and these "other" patches may be applied after the earlier defined patches.

As shown in FIG. 1, optionally the user may provide other relevant files, such as a machine image 148 to be used for creating a compute instance, and/or other code 150 that may be run before, during, or after the build process to further customize a resultant database instance according to the user's desires (e.g., to install additional extensions, management software, related applications, or the like).

Thereafter, as reflected by circle (2), the user 102 may use their electronic device 104 to interact with the database customization service 108 to create the CDEV. This interaction may occur via an interface such as a graphical user interface (GUI), e.g., as part of web-based console application, provided by the database customization service 108. FIG. 3 is a diagram illustrating an exemplary GUI 300 useful for custom database engine creation according to some embodiments. In GUI 300, the user may utilize various user input elements (e.g., text input boxes or text areas, drop-down boxes, icons, checkboxes, radio buttons, or the like) that they user can utilize to provide input to control the CDEV creation process. In this example, input element 305 allows the user to select between particular database engines that the user is seeking to build (or, in some embodiments, the user may enter a new value for a new edition of engine). With input element 310, the user may select or provide an identifier of a particular major version of the engine.

In this example interface, the user may also provide, via input element 315, a user-specified name for the CDEV and/or a description for the CDEV via input element 320. These names and descriptions may be used for the user (or other users of a same organization, or even other non-related users) to uniquely identify the CDEV (in some context, such as that of an organization) and understand what the CDEV is—e.g., what it includes, what it is the be used for, etc.

The user may also provide via input element 325 an identifier of a storage location where the installation files are located, and/or an identifier of a storage location where the manifest is located. In some embodiments, however, the user may be able to directly create a manifest from this GUI 300 or via a linked GUI, such as by being presented a text area where the user may type in the manifest. Additionally, or alternatively, a first draft of a manifest may be created by the database customization service 108 in some embodiments, e.g., by scanning the location identified by the installation files location and pre-populating a list of files, or otherwise providing these files to the user so that they can arrange them as desired (e.g., place them in the proper order according to installation order).

In some embodiments, the user may also configure the underlying host, e.g., select a particular instance type via input element 335 (e.g., a particular configuration of resources, having an amount of compute capacity, memory capacity, bandwidth capacity, attached accelerators or capabilities, or the like), identify an operating system via input element 340 (e.g., by selecting from a list of known, available operating systems, or by providing a link to a user-provided operating system, such as a machine image 148 stored by the user in a storage location 140), and/or provide operating system configuration values (e.g., setting computer names, updating passwords, default values, etc.) via input element 345.

This configuration may allow the user to dictate how the CDEV is built, validated, or how database instances created later are configured. For example, as shown, the GUI 300 may allow the user to indicate at what relevant phase(s) this configuration is to be used—here, via checkbox 347, a user may indicate that the compute instance related configuration is to be used for both building the CDEV as well as also validating the CDEV. By way of example, a user may wish to control the resources used for building and validating, such as when licensing restrictions associated with a database engine are based on a number of cores, vCPUs, etc., are used. Thus, a GUI 300 could allow the user to indicate a maximum number of cores (e.g., ten) that can be used across all concurrent CDEV builds and/or validations. As another example, a user may wish to perform builds using "smaller" compute instances (e.g., having comparatively fewer or less performant processing resources, memory, etc.) and validation using "larger" compute instances, and thus the user may configure the amounts and/or types of instances to be used separately for separate phases.

Upon finishing this process, the user may select the "create" input element 350 to send this information (or, just a command, such as when the interface already sent the user-provided to the database customization service 108) to the database customization service 108 to cause it to begin the generation of a CDEV. This submission may cause an API call to be issued, for example, a "create-custom-db-engine-version" call to an endpoint of a provider network that includes user-provided data from this GUI 300. Of course, in other embodiments, such a GUI 300 may not be required, and the user may provide this information in other ways, such as in separate configuration files, directly as arguments in an API call, or the like.

In some embodiments, this process may include the use of database installation files 142 that are stored outside of a storage location 140 of the provider network 100. For example, the user may provide (e.g., via the manifest 146, or via arguments of a call made at circle (2)) an identifier of a publicly available source code repository (e.g., provided by a repository service/website, hosted by a private server, etc.), an identifier of a set of one or more files hosted or provided by a website (e.g., a website of an open-source project making binaries and/or source code available for download) or distributed peer-to-peer type system, etc.

Turning back to FIG. 1, at circle (3) the database customization service 108 may execute a multi-phase build process for the CDEV, resulting in a CDEV being created (e.g., a binary volume snapshot/backup of a database volume and a machine image) that can be used to launch a corresponding database instance. The CDEV may be stored back in a user-accessible storage location, or within a location only accessible to the database customization service 108 and/or managed database service 110. The CDEV build process, as described herein, may involve a variety of phases such as a pre-check validation, build, post-check validation, etc. Details of these phases will be presented in detail later herein.

Once a CDEV has been created, the user (or another associated or non-associated user) may interact with the database customization service 108 to utilize the CDEV to launch one or more database instances 114 as shown at circle (4). In some embodiments, the one or more database instances may be launched by the managed database service 110 using resources controlled by the managed database service 110, though in other embodiments the launch may include launching the database instance(s) using compute instances provided by a hardware virtualization service (e.g., under the user's account, giving the user direct ownership of the instances) of the provider network, or even launched in a completely separate environment such as a third-party cloud provider network, the user's on-premise location or data center, etc. In these scenarios, the managed database service 110 may perform the launches itself for the user or may provide the custom database engine version(s) 112 to the user so that the user may launch the instances on their own.

However, under the shared management model where the managed database service 110 is partly managing the lifecycle of the database instance(s) 114, at circle (5A) the user (via client 105A) may have direct access to the compute instance 128 to perform management-type operations 138, while the database customization service 108 (or, components of the managed database service 110) may also be able to perform management operations 134 as shown at circle (5B). Additionally, one or more clients 105A-105B may utilize the database instance(s) 114 in a typical manner, and thus database traffic 136 may be sent therebetween as shown at circle (6).

Figure 4:
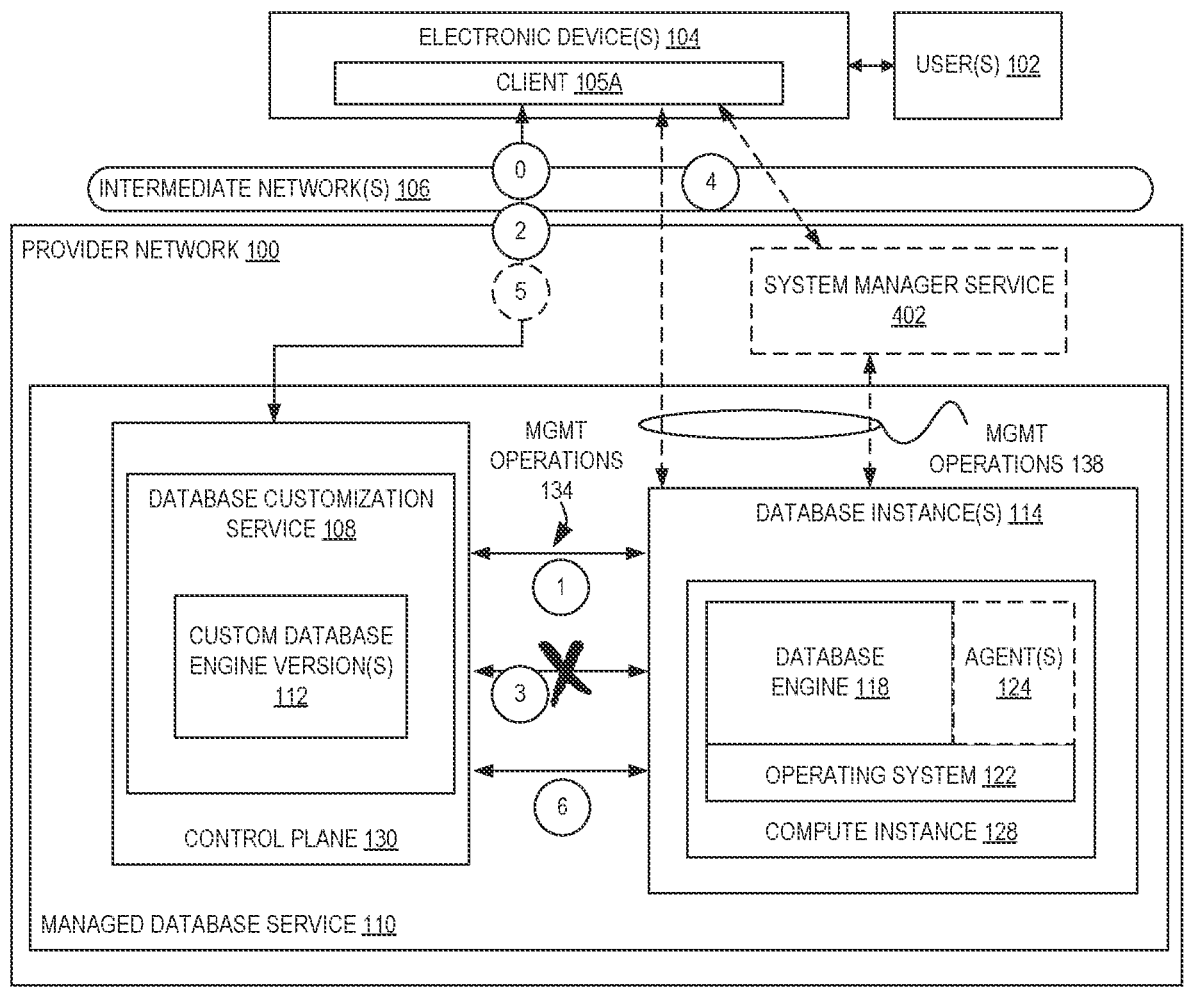
FIG. 4 is a diagram illustrating an environment for utilizing a custom engine version of database software in a shared management environment according to some embodiments.

For further detail, FIG. 4 is a diagram illustrating an environment for utilizing a custom engine version of database software in a shared management environment according to some embodiments. A user 102 may use a CDEV by utilizing an electronic device 104, via a client 105A (e.g., an application such as a web browser, special-purpose application, etc.), to send one or more requests as shown at circle (0) to the database customization service 108 to launch a database instance 114 based on the CDEV. The request(s) may include a "create db instance" type API call that is similar to other calls used by traditional managed database services, but here, it notably includes an identifier of the CDEV to allow the managed database service 110 to launch that particular custom database software. Additionally, or alternatively, the user may instead use a CDEV to create a database instance via use of a graphical interface, such as a web-based console, to select the CDEV of interest, optionally provide other database configuration data, and instruct the database customization service 108 to launch a database instance.

After the launch of the database instance 114, the control plane 130 (of the managed database service 110) may perform management operations as reflected by circle (1), which could include monitoring the performance (e.g., throughput, task completion rate or bandwidth, etc.) of the compute instance 128 and/or database engine 118, monitoring resource utilization of the compute instance 128 (e.g., CPU utilization, bandwidth utilization, memory utilization, and the like), etc., and further configuring the database instance 114 (e.g., via messaging with a hypervisor or manager type component supporting the compute instance 128, via messaging with one or more agents 124) as needed to ensure the performance of the database instance 114.

In some embodiments, the user 102 can perform management of the database instance 114 by causing, at circle (2), a command to be sent to the database customization service 108 to indicate a desire to do such management. This can ensure system stability, e.g., by halting possible management automations performed by the database customization service 108 to ensure that the user's management operations do not interfere with those of the database customization service 108. Thus, the user 102 may cause the client 105A to send a command (e.g., via an API call, via use of a web-based application, etc.) to pause (or halt) the database customization service's management for a period of time, where the period may be a defined amount of time or an indefinite amount of time, e.g., a user-supplied time or default time such as 60 minutes, 90 minutes, 24 hours, or the like. Thereafter, at circle (4), the user may perform management actions, e.g., by connecting directly to the compute instance 128 (e.g., via a SSH connection) or indirectly managing the instance via a separate system manager service 402, that itself can perform management operations on behalf of the user.

At the expiration of the "pause" time period, and/or upon the client 105A sending a command to end the pause time period (as reflected by optional circle (5)), the database customization service 108 may resume its management operations (e.g., monitoring, instance recovery) at circle (6). Thus, as needed, the user may perform management of the database instances that users were unable to previously perform in managed database environments, while the database customization service 108 (or other modules of the managed database service 110) can also continue to manage these database instances on behalf of the users.

In some embodiments, upon the conclusion of this "pause" time period, the database customization service 108 may gain access to a record of changes made to the database instance 114 by the user 102. For example, an agent 124 may watch the management traffic and record (and/or transmit) a log or summary of the changes that occurred, the commands that were issued, etc. Additionally, or alternatively, the system manager service 402 may provide this summary to the database customization service 108, and/or another monitoring service (that obtains logs from compute instances across the provider network) may likewise be able to provide information to the database customization service 108 regarding activity of the database instance 114. This information can be used, by the database customization service 108, to determine the updated state of the database instance 114, for example, to avoid causing problems through later management operations due to expecting it to be in a different state, to detect (and report or fix) possible problematic actions performed by the user during this time (e.g., an erroneous action that causes a problem, a violation of a policy, etc.), etc.

Figure 5:
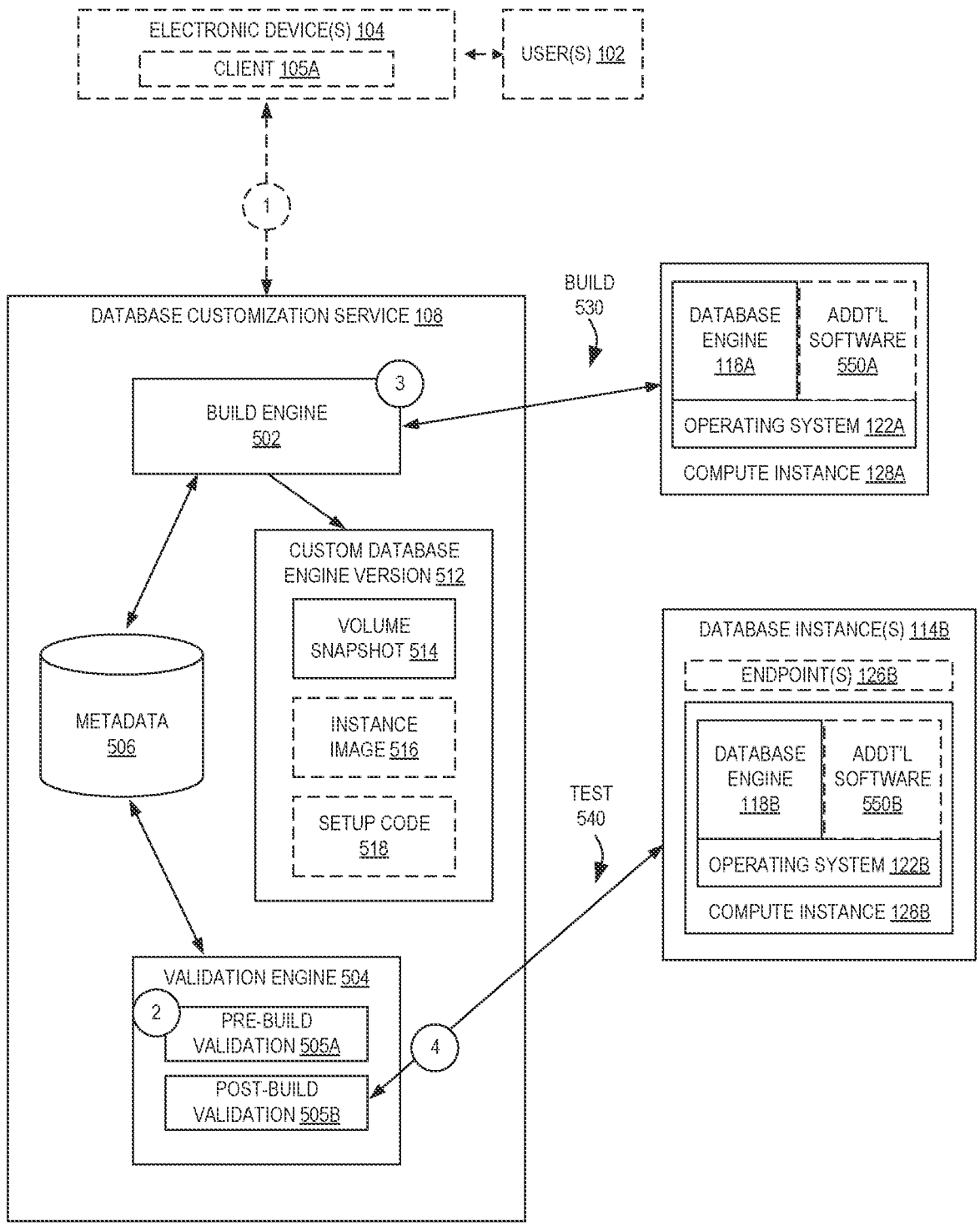
FIG. 5 is a diagram illustrating aspects of a database customization service for building and validating custom database software according to some embodiments.

As indicated above, the database customization service 108 creates custom engine versions for users that can be used to run custom database instances that can be operated under a shared-management model. This creation process in some embodiments includes build operations and validation operations. For example, FIG. 5 is a diagram illustrating aspects of a database customization service for building and validating custom database software according to some embodiments. As shown, the database customization service 108 includes a build engine 502 to build a CDEV 512 via use of a compute instance 128A, an engine version metadata 506 data store to maintain data describing the CDEV and/or the build process, and a validation engine 504 to validate the build (e.g., in a pre-build validation 505A and/or a post-build validation 505B) to ensure it is functional and that database instances launched using the CDEV adhere to requested properties.

As described herein, database software in the form of CDEVs for database engines can be built by the build engine 502 from "media" files provided by (or selected/identified by) users in the form of database installation files, which may include source code, object files, shared libraries, executable files, etc. This database software is typically run on a particular Operating System (OS) configuration. Metadata describing the database software, operating system, and the configurations thereof, can be stored in engine version metadata 506, such as the DB/OS vendor, version information, installed components or features, patches or bug fixes, additional software, and/or dates associated with any or all of the above. In some embodiments, the database customization service 108 may thus support a "bring-your-own media" (BYOM) feature where users provide the database media and optionally supply or specify their DB/OS configuration and additional software 550A-550B. For example, the user 102 may supply an OS configuration based on a particular OS vendor or OS distribution, along with the version of the OS, and optionally additional features enabled (e.g., database extensions), software installed (e.g., antivirus software), or patches installed. The database customization service 108 may then provide automation and guard rails for the building of CDEVs. The resulting CDEV that is built and validated may be run in the managed database service 110, or the database customization service 108 may be a stand-alone service where the user can download and run the resulting engine version in a self-managed environment.

In other systems where users would manually build their own engine versions, these users would need to consult community and/or vendor documentation on how to build the engine versions and determine what the best practices are. Users would also need to keep up to date with potential issues that have been found with database media files, build processes, or DB/OS configurations. Further, users would need to manually test the new engine version or write their own automation to do so.

In contrast, embodiments disclosed herein can remove this burden and complexity by both automating the build process, responsive to a user request at circle (1), via a build engine 502 and validating the resultant CDEVs, by a validation engine 504, that users want to create. This validation may happen in the context of an OS configuration that is either provided by the database customization service 108 and/or by the user. Optionally, the users may specify particular DB/OS configurations and/or additional software 550 to be validated. The additional software 550 may include database extensions, external procedures, plugins, stand-alone third-party software, operating system libraries or features, etc. The database customization service 108, by the validation engine 504 at circle (2), may validate that the supplied media, DB configuration, and OS configuration will result in a "valid" or desired engine version. To help with this, the database customization service 108 may track metadata, in the engine version metadata 506, related to the DB media, DB/OS configurations, and additional software. This metadata may be used as a pre-check, by the validation engine 504, prior to the actual building of the engine version.

After the initial prechecks, the build engine 502 may then run build operations 530 at circle (3) to build/compile/install the media on a database instance 114A having the requested DB and OS configuration and optional additional software 550A. Thereafter, the validation engine 504 at circle (4) may perform some post-build validation 505B checks against the new engine version. The build validation may include checking logs, exit codes, or performing other logical checks to determine whether the build steps were successful. The build validation may also include running commands to make sure the build of the database software appears valid and/or has the required patches, bug fixes, enabled/disabled features, or other additional software 550B installed correctly. This pre-check validation against the metadata of the engine version metadata 506 gives the database customization service 108 the ability to quickly notify the user that there is something wrong with the specification of the engine version they want to build. This will save the user substantial time and the expense of running the build process and/or executing the post-build validation. This metadata of the engine version metadata 506 that is stored and utilized may include information about the database media, OS, or additional software that allows the database customization service 108 determine whether it came from the correct source and remains unchanged, e.g., using methods such as generating and comparing file checksums (compared to those published by the authors of the media), repository tags, change numbers, or other methods. The engine version metadata may also or alternatively include information such as the date the media, OS, or other additional software was made available, bug numbers and/or dates related to security/bug fixes, or whether there are any issues with the media, OS, or other additional software. Bug fixes may include identifiers from the database, OS, or other software. The metadata may include public bugs or security issues such as Common Vulnerabilities and Exposures (CVE) numbers or provider network-internal bug tracking information. The metadata may also include dependencies or conflicts with media, the OS configuration, or other additional software—either from public sources or from database customization service 108 observation or testing.

Operators of the database customization service 108 may also perform testing or research that may then feed back into this metadata 506. For example, in some embodiments, the operator (or automated processes within the database customization service 108, such as via previous runs of the build process) may tag media file(s), or DB/OS configurations as causing database corruptions, having functional issues, or having stability or performance problems. This metadata 506 may then be used when building additional engine versions to determine if the build will result in an engine version that is valid and secure. For example, the database customization service 108 may error out the build, or provide a warning to the user, if the database media includes a known bug that causes database corruption, if the OS is incompatible or not certified with the DB engine version, if there are conflicts or missing dependencies, etc.

In some embodiments, the user may specify optional database functionality that is to be enabled/disabled or additional software that should be installed. The users may also provide an indication of the application that the engine version will be used with. Thus, in some embodiments, additional pre-check validations may be done, or additional dependencies added, based on these factors. For example, the intended application might be a particular business suite application and the metadata 506 may include information about required patches, or database functionality, or DB/OS configurations, or additional software that is required for that application or version of the application. The user may specify this intended application as part of the build process, or it may be inferred based on the provided media files, optional database functionality that is included, and/or the DB/OS configuration.

Assuming all pre-check validation 505A succeeds, in some embodiments, the build engine 502 may thus perform the build 530 at circle (3). This may include obtaining a compute instance 128A (e.g., launching, or obtaining an already existing instance) and using the provided installation files to create and/or install and/or configure the database engine 118A according to the user's submitted requirements. Metadata of this build may be stored in the metadata 506 data store, and a CDEV 512 may be generated based on use of this compute instance 128A. As one example, to volume snapshot (e.g., a point-in-time copy of a volume used by the compute instance 128A) including the database engine code and/or data may be taken to generate a volume snapshot 514 that is part of the CDEV 512 or referenced by the CDEV 512, such as via a URL or other resource identifier when the image 516 is stored external to the CDEV 512. In some embodiments, an image 516 of the compute instance 128A itself is also included (as taken of the actual compute instance 128A, or from a generic instance if there are not any O/S customizations) in the CDEV 512 or a reference to the image 516 is included in the CDEV 512. Additionally, in some embodiments, the CDEV 512 also includes or references setup code 518 that may be run to customize a newly launched instance (e.g., based on the image 516) and/or a newly-launched database engine 118A (e.g., based on the volume snapshot 514) according to the preferences of the user.

After an engine version 512 is built, the validation engine will optionally, at circle (4), validate that the resulting engine version has the desired functionality, is stable, and/or is performant. The validation engine 504 may run one or more validations, via test traffic 540 at circle (4), on the engine version with a running database instance 114B launched based on the CDEV 512.

Post-build validations 505B may include verifying that the engine version and the OS configuration will allow for a database to be successfully created. It may also include validations of a database instance 114B that is created from the engine version, including checks such as checking for incomplete or invalid components or features in the database, running functionality tests to make sure the database is working correctly, running performance or stability tests, and/or testing of database "upgrades" between previously created engine versions and this new engine version.

The types of validations performed against a new engine version may be based on configurations the managed database service 110 has for those database engines, or may be based on user input, or some combination of the two. For example, a customer may or may not want a particular piece of database functionality tested based on whether they are using that functionality, have installed that functionality, and/or are licensed for at functionality. Moreover, choosing to not run all post-build validation tests may reduce the time it takes for an engine version to be built and tested, or might reduce the cost of the resources used for the verification.

Figure 6:
FIG. 6 is a diagram illustrating an exemplary graphical user interface for obtaining user-configured build and run policies for CDEV governance according to some embodiments.

As described herein, the database customization service 108 may provide safeguards with errors or warnings (e.g., sent to the device of the user attempting to create a CDEV) during the build process for a new engine version if the metadata associated with the media files and/or DB/OS configuration does not meet the user's requirements. These user requirements may be obtained by the database customization service 108 from the user in the form of policies created via a GUI. For example, FIG. 6 is a diagram illustrating an exemplary graphical user interface 600 for obtaining user-configured build and run policies for CDEV governance according to some embodiments. This GUI 600 may be provided via the database customization service 108, e.g., by sending data for this interface (e.g., a webpage or associated code) to the computing device of the user.

By way of example, users—such as an administrator of an organization—may want to make sure that across the organization (e.g., by other user accounts within the same organization) CDEVs having particular characteristics can (or cannot) be built. Thus, this user may configure a set of build policies to implement these desired goals. For example, the GUI 600 presents a variety of user input elements (e.g., checkboxes, text input areas, radio buttons, or the like) to allow the user to create custom policies to govern the building of CDEVs that can be implemented using logical conditions that can be evaluated. For example, the user may wish to require that only CDEVs for open source DB engines or commercial DB engines are built, that only a particular major version for a DB is built, that a particular "flavor" of OS is used, that a particular bug fix is included, that a build does not contain any "critical" CVE vulnerabilities (or CVE vulnerabilities of a particular level or levels of severity, having severity level scores above a threshold, etc.), that the build includes the most up to date or stable set of installation files, that the security fixes are not older than a certain amount of time, that the build will meet the requirements of a given standards/compliance program (e.g., HIPAA, FedRAMP, PCI), etc.

Similarly, the database customization service 108 may also provide user interfaces to control the use of CDEVs in launching and running database instances. For example, a user may desire that no database instance is running that has a critical CVE. Thereafter, though a fleet of multiple database instances are launched that satisfy this criterion initially, a subsequent discovery of a CVE that affects the fleet can allow the database customization service 108 to detect this issue and respond according to the user's desires—e.g., notify the user, terminate the database instances, increase an amount of security applied to traffic using these instances, automatically patch the database instances, place the instances into network isolation (e.g., limit or remove network connectivity to and/or from the instances), or the like.

Figure 7:
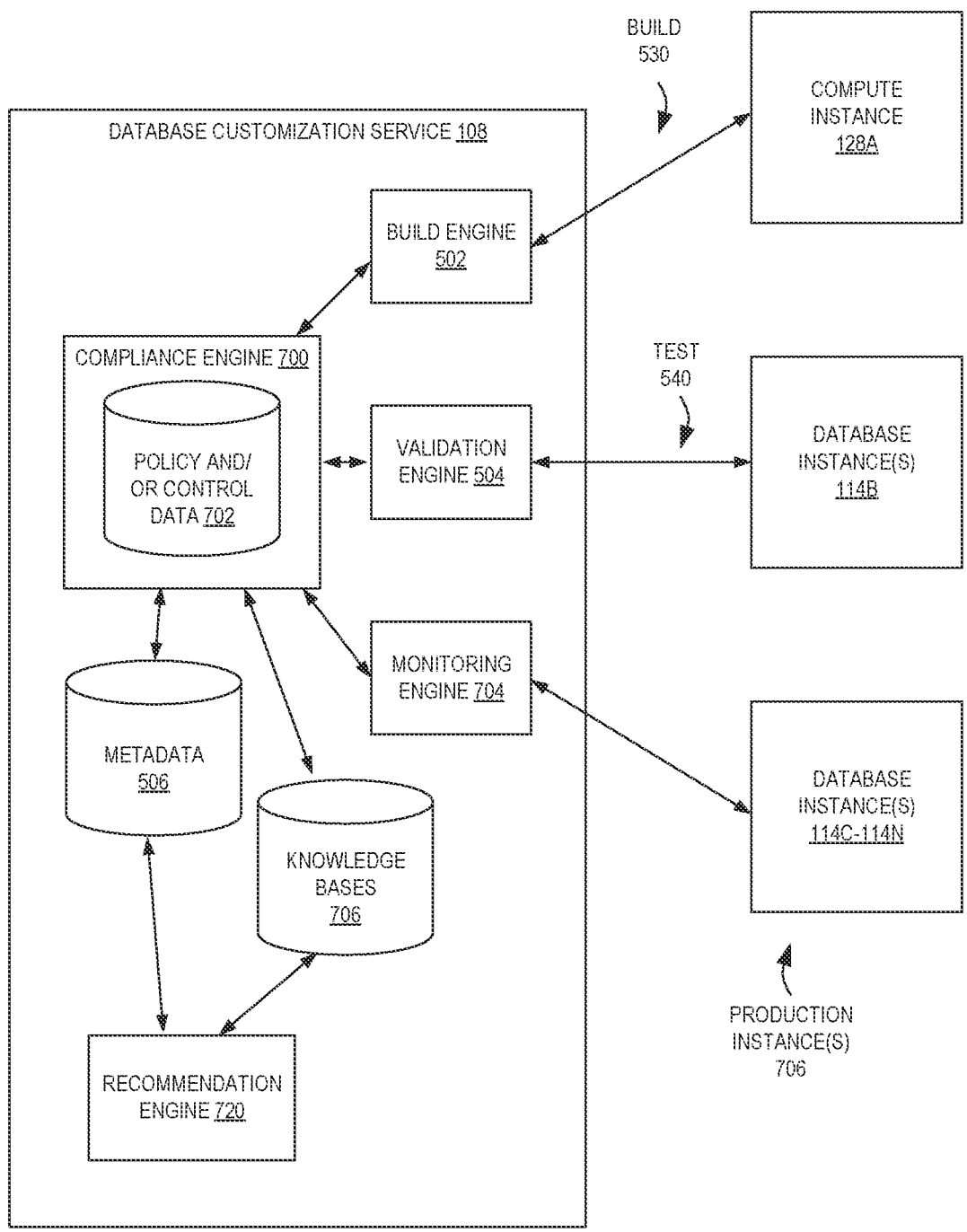
FIG. 7 is a diagram illustrating a compliance engine and recommendation engine of a database customization service according to some embodiments.

To implement these policies, in some embodiments the database customization service 108 includes a compliance engine that implements such controls, e.g., via the use of user-defined policies. These policies may be used during the build process (e.g., pre-build, post-build) and/or during the use of these CDEVs or resulting database instances. FIG. 7 is a diagram illustrating one such compliance engine 700 of a database customization service according to some embodiments that includes a data store that stores policy and/or control data 702 corresponding to the user-configured policies. This policy and/or control data 702 may be used by the build engine 502 and/or validation engine 504, as shown, and/or used by the database customization service 108 (or related service) to monitor the ongoing use of database instances launched from a particular CDEV.

Users may want control over what validations are done against a given engine version and how those validations are done. For example, a user may want to ensure certain database functionality is tested (or specifically not tested), make sure specific optional database functionality is included or not included, or they may want to limit the amount of resources used concurrently or over time for testing. If performance or stability testing is specified, the policy may indicate thresholds based on performance or stability metrics, either as absolute metrics or comparisons to previous engine versions.

Thus, the database customization service 108 may provide the ability for an organization to create a "policy" that defines the rules for both building and validating engine versions. The building of engine versions may be done by particular people or organizations within a company that is separate from those who are responsible for the policy. The company may want to make sure that the build process for new engine versions meets their compliance requirements, internal security rules, legal/contractual requirements, and/or organizational preferences. Users may not be required to setup a policy when creating a CDEV but may also specify their requirements each time they build a CDEV.

For CDEVs that are built by the managed database service 110, users may also want to evaluate whether these new engine versions meet the policy they already have set up for their organization or user account. In this case, managed database service 110 is building the engine version based off the "recipe" it chooses and optionally makes the engine version available to users. If a given managed database service 110 engine version violates their policy, users may not want to make it available for use internally within their company.

Policies may also apply to running database instances and not just new builds of engine versions. The managed database service 110 may notify the user, and/or take action, when an existing database instance no longer meets their policy rules. This could be due to the engine version "aging" against their compliance or security requirements around how old of security patches an engine version can contain. It also may occur due to changes in the score or severity of a given bug or CVE vulnerability, or changes in the internal managed database service 110 determination of the criticality of a given bug, or it may change based on modifications the user does to the policy—or to a running instance—itself. For example, the user may manually manage a database instance and turn on or otherwise enable a particular feature that is barred according to the policy, such as the use of partitioning in a database engine, the use of a particular feature of an operating system (e.g., security controls), or the like.

In some embodiments, the managed database service 110, via monitoring engine 704, may upgrade or schedule upgrades of running database instances (e.g., production instances 706) off of a "source" engine version or DB/OS configuration that no longer meets the user's policy, to a "target" engine version, or OS/DB configuration, that does meet the user's policy. For example, upon the release of a new CVE, the compliance engine 700 may identify running production instances 706 that would no longer have a satisfied policy (e.g., via policy and/or control data 702), such as by identifying policies in place, having existing database instances 114C-114N in operation, that would be violated by the existence of the CVE. Alternatively, or additionally, the monitoring engine 704 may perform these operations, e.g., by directly (via interactions with the instances 706) or indirectly (e.g., via analysis of metadata 506 indicating the current state of the database instances, and/or policy and control data 702 indicating the particular policies in place, and/or data obtained from a separate monitoring or log-providing service of the provider network, and/or via a set of knowledge bases 706 providing information regarding security issues, etc.) monitors the state of production instances 706 such as database instances 114C-114N to identify these scenarios. When such new non-compliance scenarios are determined to exist, the database customization service 108 may act in a variety of ways configured based on the desires of the affected users and/or the desires of the provider. For example, the affected database instances 114C-114N may be upgraded to one or more new versions that will satisfy their corresponding policies (e.g., a new patch is applied that addresses the CVE), the affected user may be notified, enhanced security measures for traffic may be enabled (e.g., additional authentication, additional checking for malicious activity), the instance(s) may be placed in a network-type quarantine where certain or all traffic is not allowed to be sent to and/or from the instances (until the user stops the quarantine and/or the policy non-compliance is eliminated), etc.

In scenarios where upgrades are performed, these upgrades may be limited based on the stated preferences of the associated users. For example, upgrades may be limited to engine versions within the same major engine version of the source engine version and/or may be limited to engine versions that contain a superset of media files, functionality, or bug fixes. Alternatively, the user may configure their policy so that the user is just notified of the issue instead of scheduling an upgrade automatically. Similarly, if a compatible upgrade is not found, the managed database service 110 may decide just to notify the user, or the managed database service 110 or user may choose instead to have their database instance disabled or "network quarantined" if a policy violation is found, either immediately or after a certain grace period time has elapsed. Upgrades may also be run automatically when new instances are created, or when databases are restored, or the user specifies that new instances or restores cannot happen on engine versions that don't meet their policy.

In some embodiments, the database customization service 108 may also include a recommendation engine 720 that provides users with recommendations regarding a CDEV that they are attempting to build. This recommendation engine 720 may also make use of the metadata 506 and/or knowledge bases 706.

When the managed database service 110 builds engine versions, a set of best practices are utilized that result in a stable, secure, and performant engine version. These best practices sometimes come from the community or database vendor, but may also come from provider network internal testing or lessons learned over time. These best practices can be provided to users of the database customization service 108 as a set of recommendations. For example, there may be different types or "flavors" of recommendations such as a "latest stable" configuration, a "most recent" configuration, a "latest security" configuration, etc., each corresponding to a set of recommended values/configurations (e.g., installation software versions, suggested patch sets, tuning options, etc.) for a CDEV build.

In some embodiments, the database customization service 108 may provide recommendations based on the application the user seeks to run, the compliance standard/program their application needs to meet (e.g., HIPAA, FedRAMP, PCI), etc. These recommendations may include suggestions regarding the engine version software (e.g., to use a particular engine vendor project/product, to use a particular version, or the like) or other database configuration related aspects such as database parameters or optional components/features to be enabled/disabled or added. Recommendations may also include OS configurations as well. The database customization service 108 may make this the default behavior when building an engine version, or users could optionally enable or disable recommendations. Engine versions that have recommendations enabled but fail those recommendations may either throw a warning/notification to the user, or, the database customization service 108 may also fail/halt the build. Optionally, in some embodiments the recommendation engine 720 may be used, per a user request, to run recommendations check on an existing, previously created engine version.

Recommendations may include ensuring that the latest media or DB/OS configurations are being used in a build. For example, a user may not realize that a new major or minor version is available for an engine, or that a more recent patch set, cumulative update, or individual patches exist. Database updates might include recently released security fixes, updates to time zone rule, updates to vendor recommended patches, updates to recommended DB configurations, updates to recommended OS configurations, or an update to what is considered the most stable release. Changes to recommendations may be input from an operator of the managed database service 110 and/or may be automatically updated (e.g., via obtaining data from third party sources, such as a provider of CVE information, database vendors, etc.).

Figure 8:
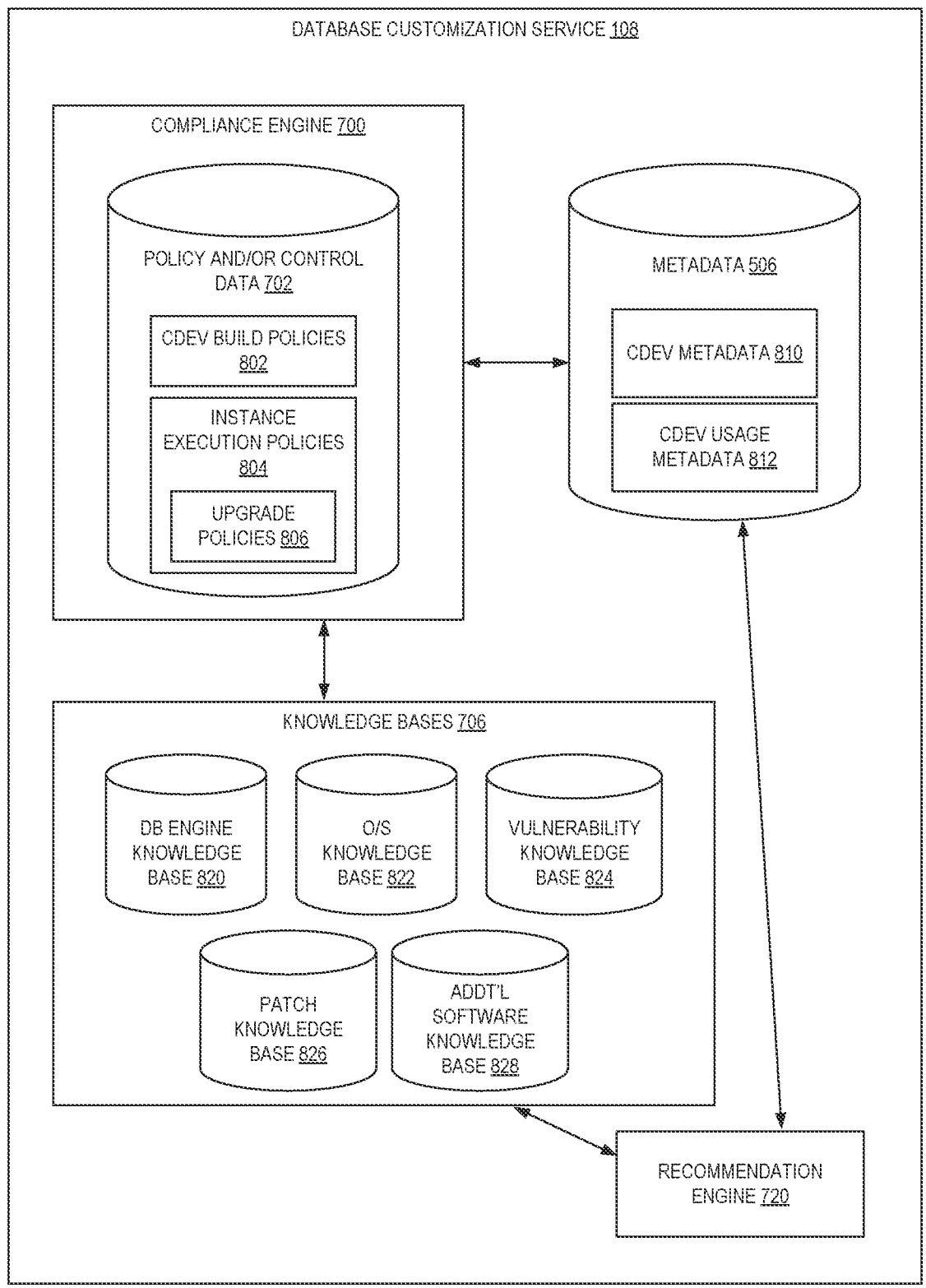
FIG. 8 is a diagram illustrating exemplary information types utilized by a compliance engine and/or recommendation engine of a database customization service according to some embodiments.

FIG. 8 is a diagram illustrating exemplary information types utilized by a compliance engine and/or recommendation engine of a database customization service according to some embodiments. As indicated above, the compliance engine 700 may utilize a number of different types of information to detect scenarios where a database instance (or CDEV) is not compliant with an associated user-configured policy. In some embodiments, the compliance engine 700 includes (or owns/manages) a policy and/or control data 702 data store that includes policy-related information, such as a set of CDEV build policies 802 configured by users to control the build process (e.g., to require a particular configure or disallow particular configurations) for an individual build or for any builds associated with the user or the user's organization or unit. The policy and/or control data 702 data store may also include instance execution policies 804 that define user-configured controls over the subsequent execution of database instances, for example, and may specify if, when, and/or how to perform upgrades via upgrade policies 806. One such upgrade policy 806 may indicate that an instance is not to be auto-upgraded but instead one or more associated users are to be notified; another such upgrade policy 806 may indicate that, if a policy-compliant version of the instance can be made via an upgrade, then the upgrade should occur at some point in time—e.g., as soon as possible, at a particular time of day or day of week, etc.

The compliance engine 700 may analyze information from a variety of sources to determine whether policies are violated. For example, the compliance engine 700 may monitor a set of knowledge bases 706 to identify the existence of new security vulnerability issues (e.g., via a vulnerability knowledge base 824 that is manually and/or programmatically updated), and/or examine a database engine knowledge base 820 and/or operating system knowledge base 822 to determine characteristics of particular database engines or operating systems, e.g., to determine whether a particular engine or O/S is affected by a particular vulnerability, etc.

The compliance engine 700 may also analyze metadata 506, as disclosed herein, which may include information allowing the compliance engine 700 to identify and analyze CDEVs (via CDEV metadata 810)— and/or database instances that are running and were launched via use of CDEVs (via CDEV usage metadata 812)— that may no longer be compliant with an associated policy. The CDEV metadata 810 may indicate particular features or configurations associated with a CDEV—e.g., it may track a list of patches associated with the CDEV— which can enable the compliance engine 700 to determine whether it is vulnerable to a particular security vulnerability. The CDEV usage metadata 812 may include information allowing the compliance engine 700 to identify running instances that correspond to particular CDEVs, e.g., via an instance identifier to CDEV identifier mapping. This can allow the compliance engine 700 to, for example, identify instances that are running that correspond to a CDEV that no longer meets a policy, allowing for further investigation of these instances, possible upgrades, etc.

The recommendation engine 720 may also make use of the metadata 506 and knowledge bases 706 to generate recommendations. For example, the recommendation engine 720 may make recommendations to a user based on comparing the user's provided CDEV configuration to those of other users (via lookups in CDEV metadata 810) creating similar CDEVs to identify differences that could be highlighted to the user—e.g., if a large number of other CDEVs exist with a very similar configuration but that also include a patch not specified by the current user, this patch may be identified to the user as a suggested patch.

The knowledge bases 706 may also store metadata about related patches or similarities between patches in a patch knowledge base 826 and offer those as recommendations to users. For example, if a user chooses to install a patch that fixes a corruption issue with Large Object data types (LOBs), the recommendation engine 720 may recommend a different patch that is known to improve LOB performance In some embodiments, the knowledge bases 706 may also store metadata about related software or features in an additional software knowledge base 828 and generate recommendations to users based on this information. For example, the additional software knowledge base 828 may store identifiers of software packages that may be useful to various types of users, e.g., a user that will use a particular type of application (or use the database in a particular way) may benefit from (or need) additional software installed, such as the inclusion of a geographic information system (GIS) extension for a database engine that is useful for performing geographic-related operations known to be utilized by a particular application. Thus, required or beneficial additional software packages can be identified and recommended to users.

Figure 9:
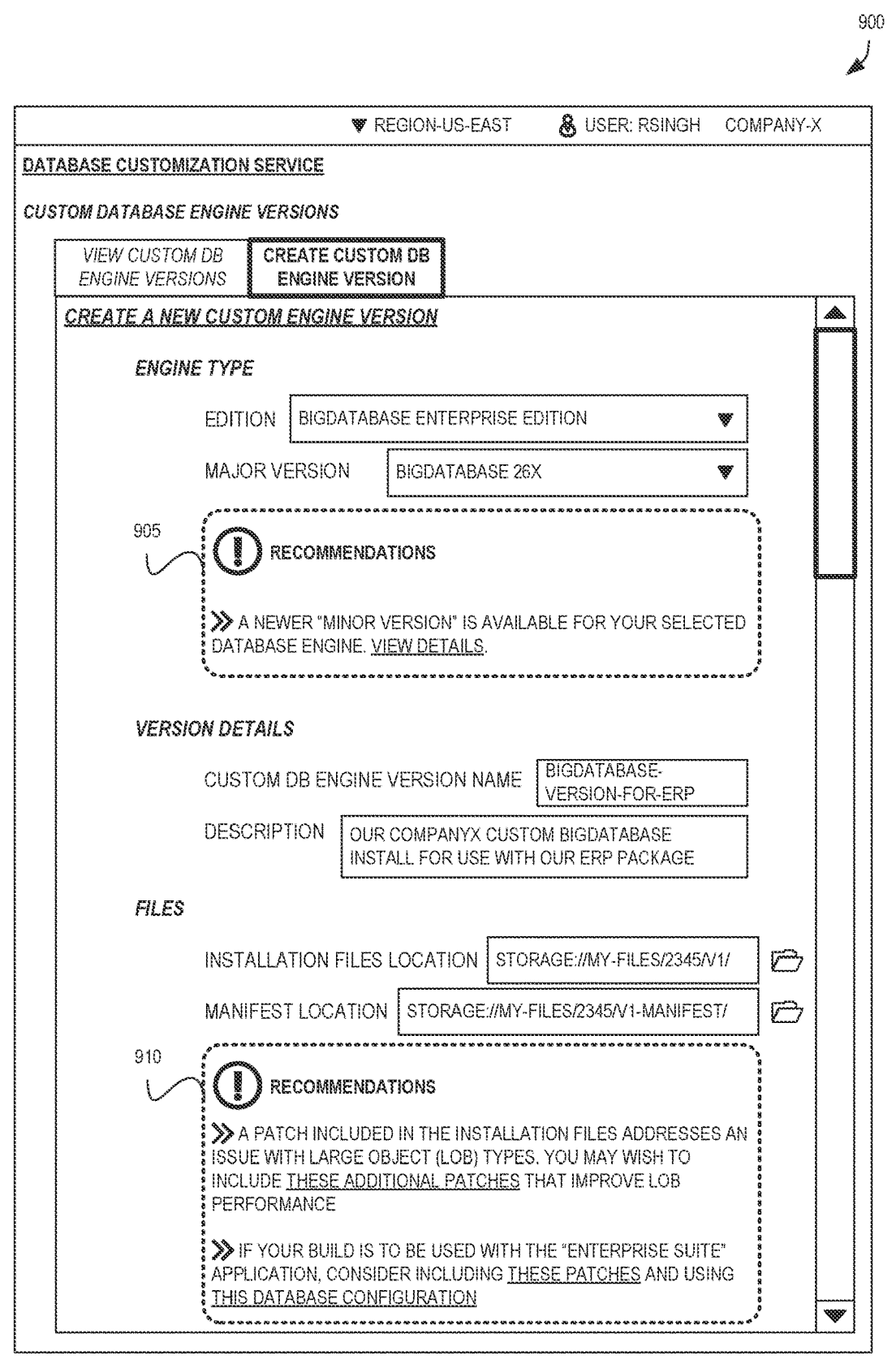

FIG. 9 is a diagram illustrating an exemplary graphical user interface including recommendations during custom database engine creation according to some embodiments. As indicated herein, the recommendation engine 720 may provide recommendations during the CDEV definition process where a user is providing information to create a CDEV, though in some embodiments, recommendations may be made at other points, such as after a user has submitted a CDEV build request, after a CDEV has been created (possibly much later in time), etc.

In this example GUI 900, a first recommendation is made in a user interface element 905 based on the user having selected an out-of-date minor version. In this case, the recommendation engine 720 may have obtained this CDEV definition from the user's input (e.g., identifiers of the selected edition and/or major version), determined that a new minor version exists (e.g., via a lookup in knowledge bases 706 and/or metadata 506), and caused the interface to be updated to present this recommendation to the user via element 905.

In this example GUI 900, a second recommendation is made in a user interface element 910 based on the user's provided patches (as part of database installation files 142). In this example, the user may have provided a location of the database installation files 142, and the database customization service 108 may analyze those files, and with reference to the patch knowledge base 826, determine that a patch is included pertaining to a particular feature (here, LOB objects) and that one or more other patches that also pertain to that feature (here, to improve LOB object processing) could or should be included as well.

Additionally, a third recommendation is provided based in user interface element 910 based on the determined (or inferred/predicted) type of application the user plans to use with database instances generated from the CDEV. In some embodiments, the user may explicitly indicate which application is to be used (e.g., via a user interface element), though in some embodiments the database customization service 108 may identify a CDEV fingerprint (e.g., a particular set of options, such as a particular database edition, major version, set of installation files, etc.) that matches a known application, and may recommend any missing or incorrect aspects of the CDEV that are required or helpful for use with the application. In this example, the user interface element 910 indicates that additional patches may be helpful and that a particular database configuration may be warranted, where the user may click on portions of this recommendation to learn more.

Thus, when it is determined that a user seeks to run a particular application, the recommendation engine 720 may recommend a particular major engine version, minor version, patch set, particular set of patches, OS/DB configuration, etc., known (or inferred, based on other users' activity) to work well for that application. Or, if a user needs to meet a certain compliance program, the recommendation engine 720 may provide recommendations that will keep them in compliance with that program—e.g., that a particular feature is to be enabled, that a particular set of patches is to be applied, or the like.

Recommendations may include a comparison to one or more existing engine versions, e.g., via analysis of the user's CDEV input and CDEV metadata 810. For example, a user may want to know if the engine version they are building is a superset of the patches or bug fixes when compared to another engine version. In some cases, an upgrade may fail if the target engine version is not compatible with, or is not a superset of, the source engine version. For example, missing patches related to Daylight Savings Time updates (e.g., for Oracle™ databases) may not result in an invalid engine version, but may cause an upgrade to fail. In other cases, the user may have hit a particular bug and wants to make sure that when they upgrade, they don't lose an applied bug fix in the target engine version. Source engine versions used for comparison may be specified at build time or may be included in a policy related to builds. In some cases, a large number of existing engine versions might be used for comparison, or the user may limit the engine versions used for comparison based on the intended application for the engine version being built, e.g., by use of tags/metadata. In some cases, embodiments may allow the build of a new engine version to succeed but may just not create "upgrade paths" for source engine versions that are not compatible with the new target engine version.

Figure 10:
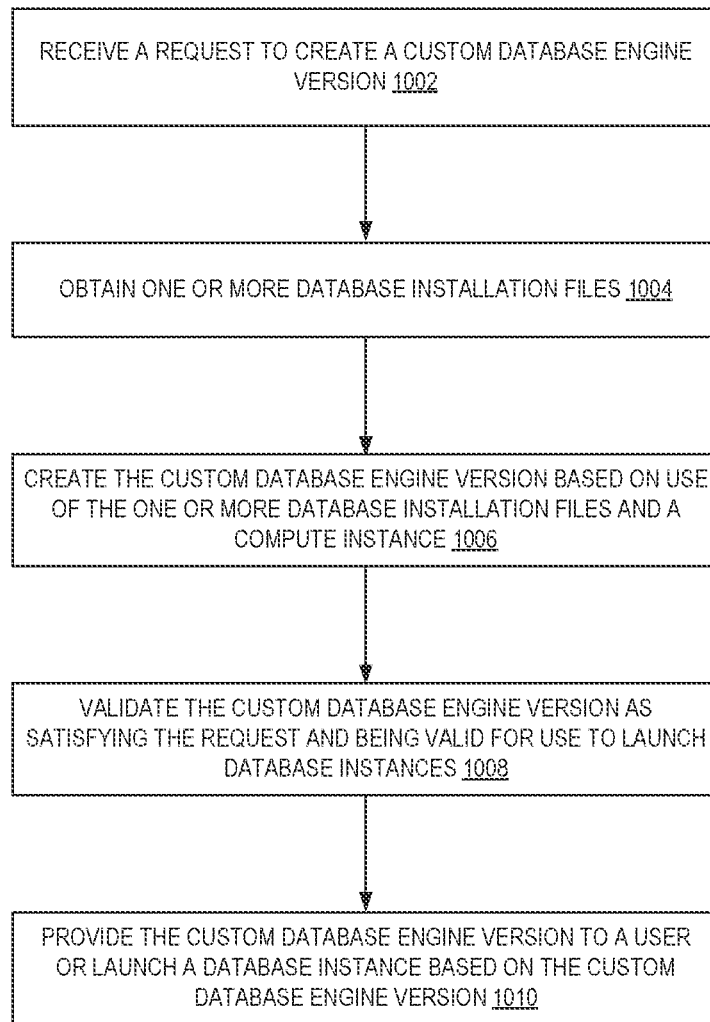
FIG. 10 is a flow diagram illustrating operations of a method for building, validating, and utilizing custom database software according to some embodiments.

FIG. 10 is a flow diagram illustrating operations of a method for building, validating, and utilizing custom database software according to some embodiments. Some or all of the operations 1000 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations 1000 are performed by the database customization service 108 of the other figures.

The operations 1000 include, at block 1002, receiving a request to create a custom database engine version, and at block 1004, obtaining one or more database installation files. The operations 1000 further include, at block 1006, creating the custom database engine version based on use of the one or more database installation files and a compute instance, and at block 1008, validating the custom database engine version as satisfying the request and being valid for use to launch database instances. The operations 1000 further include, at block 1010, providing the custom database engine version to a user or launching a database instance based on the custom database engine version.

In some embodiments, the database instance is executed in a shared management environment within a multi-tenant provider network allowing a user to have managerial access to a compute instance of the database instance while a control plane entity of the provider network also has direct managerial access to the compute instance.

In some embodiments, the request to create the custom database engine version was originated in association with a first user account of a multi-tenant provider network, and the operations further include receiving a request to launch the database instance, the request including an identifier of the custom database engine version and being originated in association with a second user account of the multi-tenant provider network; and launching the database instance.

In some embodiments, the request includes a resource identifier associated with a storage location where the one or more database installation files are located; and obtaining one or more database installation files comprises transmitting a request to obtain the one or more database installation files based on use of the resource identifier. In some embodiments, the request further includes at least one of an identifier of a manifest file or a second storage location where the manifest file is located, wherein the manifest file identifies at least one of: the one or more database installation files; a database engine version; a set of features to be enabled or disabled; or compliance program information.

In some embodiments, the request includes at least one of: an identifier of a type or configuration of compute instance to use to build or validate the database engine; or an identifier of an operating system to be executed by the compute instance.

In some embodiments, the creating of the custom database engine version includes generating an image of the compute instance or a snapshot of a storage volume utilized by the compute instance, wherein the snapshot comprises a point-in-time copy of data of the storage volume, and the custom database engine version comprises the image or the snapshot.

In some embodiments, validating the custom database engine version includes creating a database instance based on use of the custom database engine version, comprising attaching a storage volume, of the custom database engine version, to a second compute instance or utilizing an image. In some embodiments, validating the custom database engine version further includes executing tests involving the database instance; and determining results of the tests. In some embodiments, the tests include at least one of: determining that a version of the database engine matches a requested database engine version; determining that the database engine has all patches or bug fixes successfully installed from the one or more database installation files; determining that additional or dependent software has been installed; determining that the operating system is compatible or certified with the requested database engine version; determining that the database engine or the operating system has a set of requested features enabled or disabled; determining that the database engine or the operating system meets the requirements of a compliance program; determining that the database engine or the operating system is functional; determining that the database engine or the operating system satisfies a performance threshold; or determining that the database engine or the operating system remains stable over a period of time.

In some embodiments, the operations further include performing one or more validation tests prior to the creating of the custom database engine version, the one or more validation tests comprising at least one of: determining whether the one or more database installation files are genuine; determining whether the one or more database installation files include a set of features requested to be enabled; determining whether any of the one or more database installation files are marked as being superseded by alternate database installation files; determining whether any of the one or more database installation files are marked as having functional, performance, or stability issues; or determining that a configuration of the associated with the request is valid.

Figure 11:
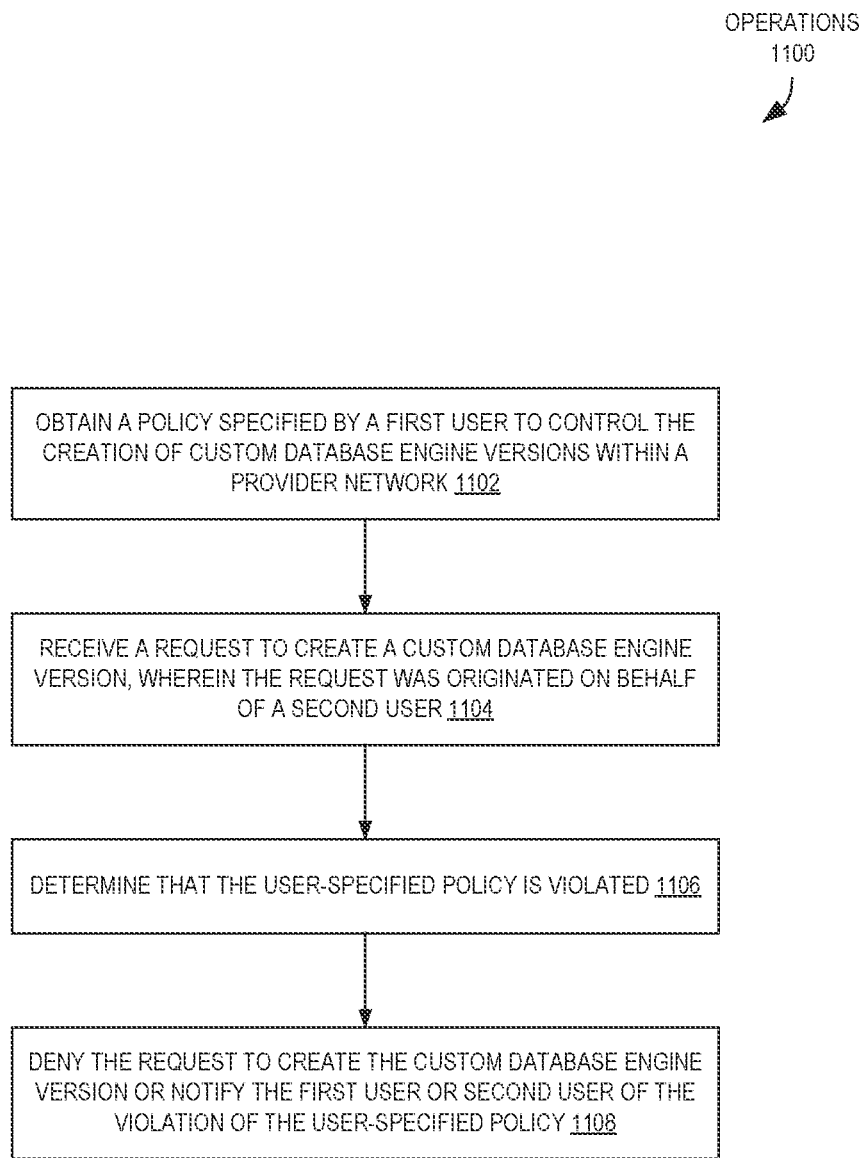
FIG. 11 is a flow diagram illustrating operations of a method for implementing policy controls for building, validating, and utilizing custom database software according to some embodiments.

FIG. 11 is a flow diagram illustrating operations of a method for implementing policy controls for building, validating, and utilizing custom database software according to some embodiments. Some or all of the operations 1100 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations 1100 are performed by the database customization service 108 of the other figures.

The operations 1100 include, at block 1102, obtaining a policy specified by a first user to control the creation of custom database engine versions within a provider network, and at block 1104, receiving a request to create a custom database engine version, wherein the request was originated on behalf of a second user. The operations 1100 further include, at block 1106, determining that the user-specified policy is violated, and at block 1108, denying the request to create the custom database engine version or notifying the first user or second user of the violation of the user-specified policy.

In some embodiments, the policy indicates that any database instance created based on the custom database engine version must have a feature enabled or must have the feature disabled.

In some embodiments, the policy indicates that any database instance created based on the custom database engine version must utilize an operating system or database engine that satisfies a condition of the policy. In some embodiments, the condition specifies that the operating system or database engine: is a version from a set of approved versions; has a feature enabled or disabled; is published by a vendor from a set of approved vendors; is open-source; has a license in a set of approved licenses; is patched with a designated patch or bug fix; does not have any known security vulnerabilities of a particular type or severity; is not missing any updates or patches of a particular type that have been made available within a threshold amount of time; or meets the requirements of a compliance program.

The policy, in some embodiments, is to further control the ongoing execution of database instances launched using the custom database engine version, and the operations 1100 further include: receiving a second request to create the custom database engine version, wherein the second request identifies an updated configuration; creating the custom database engine version according to the updated configuration; determining that a database instance that was launched based on use of the custom database engine version now violates the policy; and performing an action in response to the determination that the custom database engine version now violates the policy. In some embodiments, the action includes: identifying an upgrade to the database instance that will make the database instance again become compliant with the policy; and scheduling the database instance to be upgraded according to the identified upgrade or providing a notification indicating an availability of the upgrade. In some embodiments, the action includes: placing the database instance in a network quarantine, wherein while in the network quarantine at least some network connectivity of the database instance is eliminated or restricted; or terminating the database instance. In some embodiments, the policy indicates that any executing database instance launched based on use of the custom database engine version is to be updated or patched within a threshold amount of time after the release of a particular type of update or patch. In some embodiments, the database instance violates the policy due to one of: a change to an aspect of the policy (e.g., a more restrictive requirement being implemented), a new security vulnerability being published that affects the database instance; or a severity score of an existing security vulnerability is changed to a new value that causes the database instance to now violate the policy. In some embodiments, the database instance executes within an on-premise environment of an organization that is distinct from the provider network, and in some embodiments, the database instance executes in a self-managed manner via a hardware virtualization service of the provider network.

Figure 12:
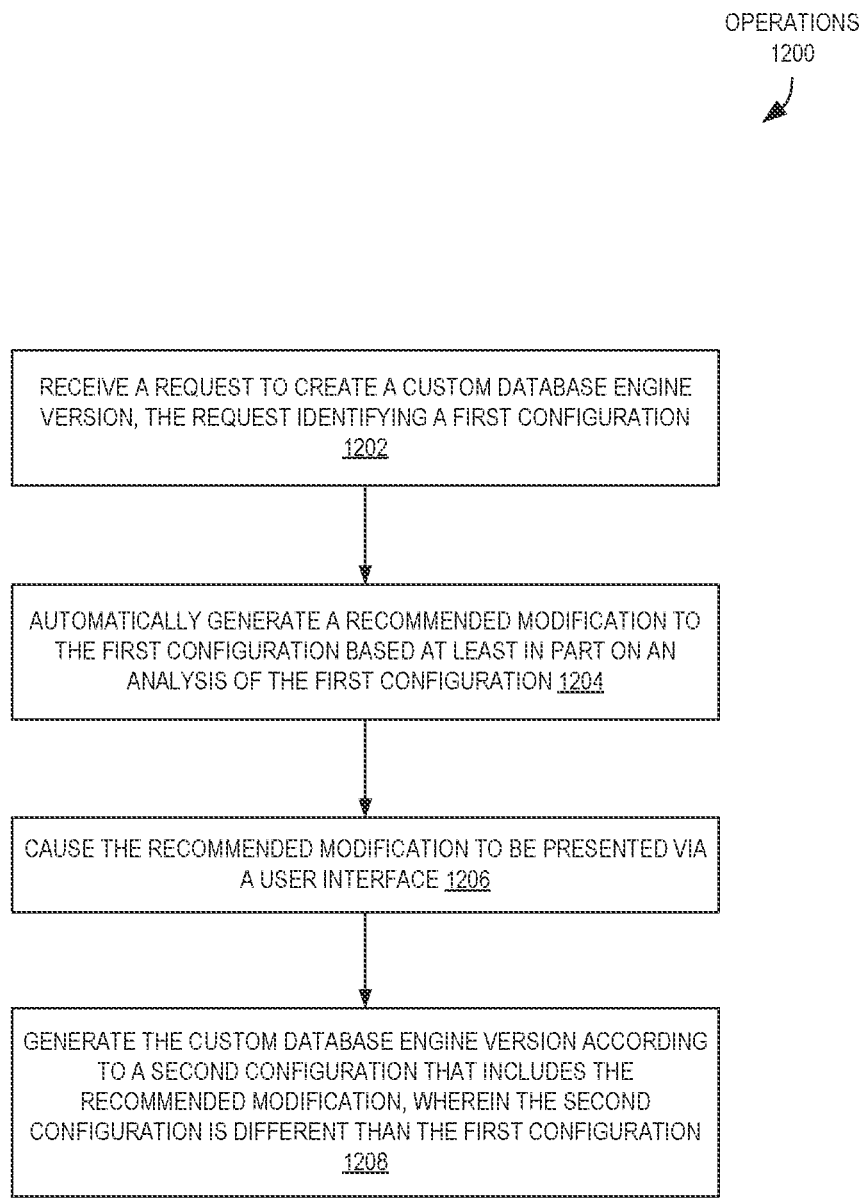
FIG. 12 is a flow diagram illustrating operations of a method for generating recommendations for building, validating, and utilizing custom database software according to some embodiments.

FIG. 12 is a flow diagram illustrating operations of a method for generating recommendations for building, validating, and utilizing custom database software according to some embodiments. Some or all of the operations 1200 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations 1200 are performed by the database customization service 108 of the other figures.

The operations 1200 include, at block 1202, receiving a request to create a custom database engine version, the request identifying a first configuration, and at block 1204, automatically generating a recommended modification to the first configuration based at least in part on an analysis of the first configuration. The operations 1200 further include, at block 1206, causing the recommended modification to be presented via a user interface, and at block 1208, generating the custom database engine version according to a second configuration that includes the recommended modification, wherein the second configuration is different than the first configuration.

In some embodiments, the generating of the recommended modification is further based on an identifier of an application to be used with a database instance launched based on the custom database engine version. In some embodiments, the operations 1200 further include obtaining the identifier of the application from within the request; or inferring the identifier of the application based on an analysis of database installation files associated with the request.

In some embodiments, the recommended modification includes at least one of: a recommended operating system type, version, or configuration; or a recommended database engine type, version, or configuration. In some embodiments, the recommended modification includes at least one of: a recommended software update or patch to be applied to an operating system or database engine; or a recommended feature or extension to be enabled or disabled for the operating system or database engine.

In some embodiments, the recommended modification includes applying a software patch, adding an additional installation file, or enabling a database engine extension or feature. In some embodiments, automatically generating the recommended modification includes: identifying a third configuration based on use of the first configuration; and comparing the first configuration to the third configuration. In some embodiments, automatically generating the recommended modification includes: identifying a feature or extension associated with the first configuration; and determining that a software patch associated with the feature or extension is not specified by the first configuration, where the recommended modification includes an addition of the software patch.

In some embodiments, automatically generating the recommended modification to the first configuration further comprises: determining that the first configuration does not satisfy a compliance standard, wherein the recommended modification, if applied to the first configuration, would place the custom database engine version, or a database instance launched based on use of the custom database engine version, in compliance with the compliance standard.

In some embodiments, automatically generating the recommended modification to the configuration based at least in part on an analysis of the configuration includes: comparing the first configuration to a third configuration of a second custom database engine version; and determining that a set of patches or bug fixes specified by the first configuration does not include at least one patch or bug fix of the third configuration, where the recommended modification includes adding the at least one patch or bug fix to the first configuration.

Figure 13:
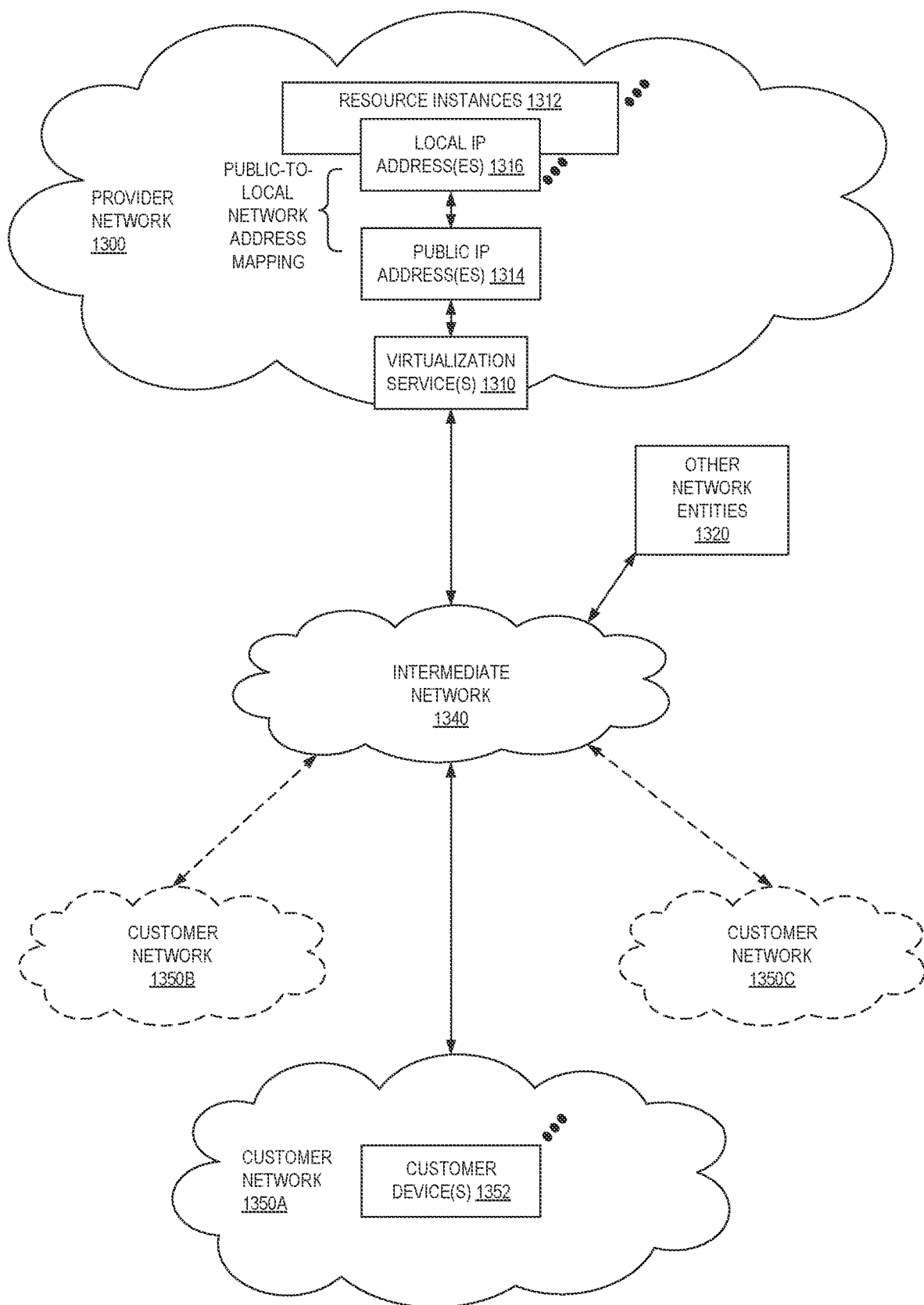
FIG. 13 illustrates an example provider network environment according to some embodiments.

FIG. 13 illustrates an example provider network (or "service provider system") environment according to some embodiments. A provider network 1300 can provide resource virtualization to customers via one or more virtualization services 1310 that allow customers to purchase, rent, or otherwise obtain instances 1312 of virtualized resources, including but not limited to computation and storage resources, implemented on devices within the provider network or networks in one or more data centers. Local Internet Protocol (IP) addresses 1316 can be associated with the resource instances 1312; the local IP addresses are the internal network addresses of the resource instances 1312 on the provider network 1300. In some embodiments, the provider network 1300 can also provide public IP addresses 1314 and/or public IP address ranges (e.g., Internet Protocol version 4 (IPv4) or Internet Protocol version 6 (IPv6) addresses) that customers can obtain from the provider 1300.

Conventionally, the provider network 1300, via the virtualization services 1310, can allow a customer of the service provider (e.g., a customer that operates one or more customer networks 1350A-1350C (or "client networks") including one or more customer device(s) 1352) to dynamically associate at least some public IP addresses 1314 assigned or allocated to the customer with particular resource instances 1312 assigned to the customer. The provider network 1300 can also allow the customer to remap a public IP address 1314, previously mapped to one virtualized computing resource instance 1312 allocated to the customer, to another virtualized computing resource instance 1312 that is also allocated to the customer. Using the virtualized computing resource instances 1312 and public IP addresses 1314 provided by the service provider, a customer of the service provider such as the operator of the customer network(s) 1350A-1350C can, for example, implement customer-specific applications and present the customer's applications on an intermediate network 1340, such as the Internet. Other network entities 1320 on the intermediate network 1340 can then generate traffic to a destination public IP address 1314 published by the customer network(s) 1350A-1350C; the traffic is routed to the service provider data center, and at the data center is routed, via a network substrate, to the local IP address 1316 of the virtualized computing resource instance 1312 currently mapped to the destination public IP address 1314. Similarly, response traffic from the virtualized computing resource instance 1312 can be routed via the network substrate back onto the intermediate network 1340 to the source entity 1320.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some embodiments, the mapping of a standard IP address to a local IP address of a resource instance is the default launch configuration for all resource instance types.

At least some public IP addresses can be allocated to or obtained by customers of the provider network 1300; a customer can then assign their allocated public IP addresses to particular resource instances allocated to the customer. These public IP addresses can be referred to as customer public IP addresses, or simply customer IP addresses. Instead of being assigned by the provider network 1300 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 14:
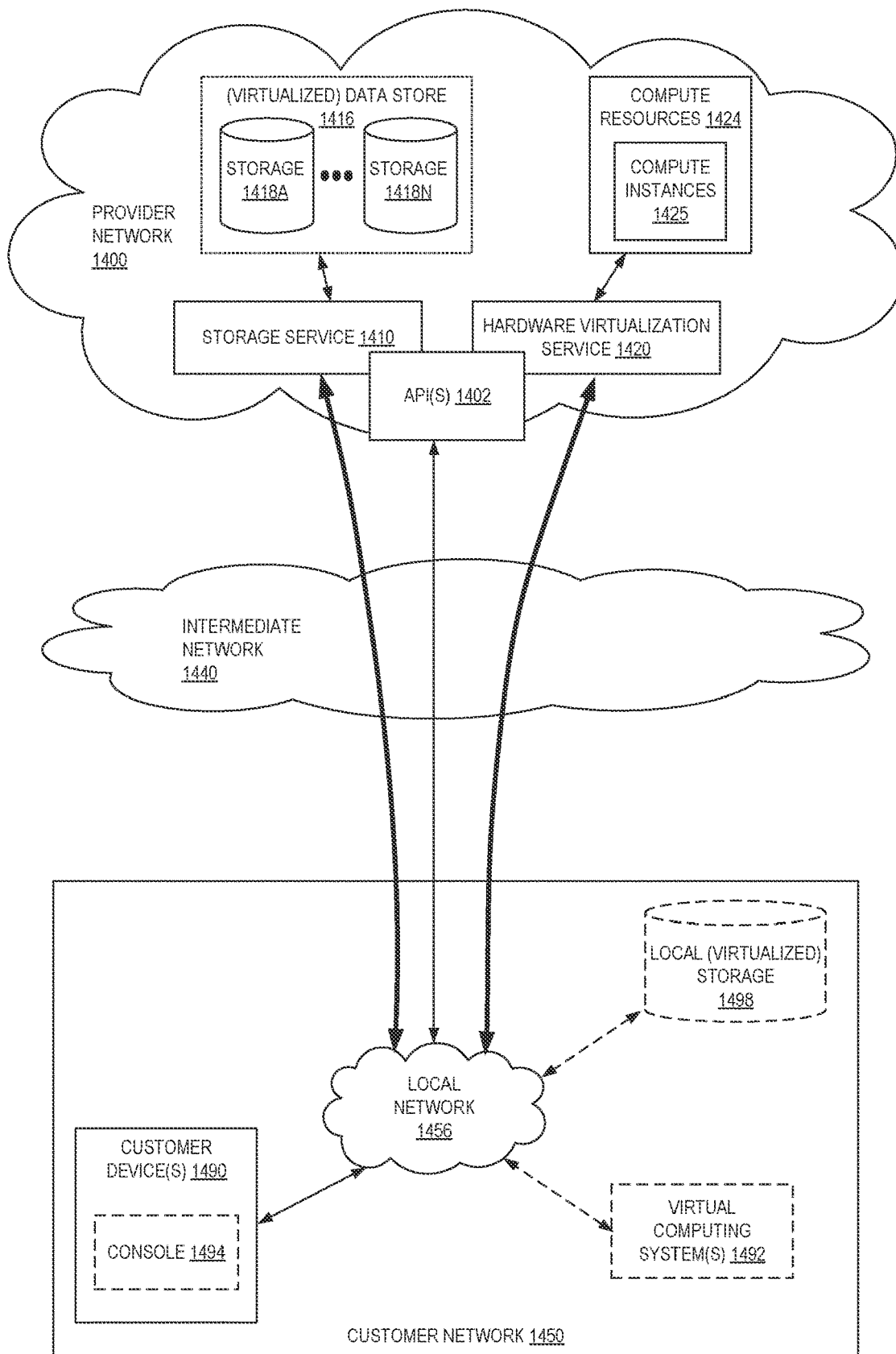
FIG. 14 is a block diagram of an example provider network that provides a storage service and a hardware virtualization service to customers according to some embodiments.

FIG. 14 is a block diagram of an example provider network environment that provides a storage service and a hardware virtualization service to customers, according to some embodiments. A hardware virtualization service 1420 provides multiple compute resources 1424 (e.g., compute instances 1425, such as VMs) to customers. The compute resources 1424 can, for example, be provided as a service to customers of a provider network 1400 (e.g., to a customer that implements a customer network 1450). Each computation resource 1424 can be provided with one or more local IP addresses. The provider network 1400 can be configured to route packets from the local IP addresses of the compute resources 1424 to public Internet destinations, and from public Internet sources to the local IP addresses of the compute resources 1424.

The provider network 1400 can provide the customer network 1450, for example coupled to an intermediate network 1440 via a local network 1456, the ability to implement virtual computing systems 1492 via the hardware virtualization service 1420 coupled to the intermediate network 1440 and to the provider network 1400. In some embodiments, the hardware virtualization service 1420 can provide one or more APIs 1402, for example a web services interface, via which the customer network 1450 can access functionality provided by the hardware virtualization service 1420, for example via a console 1494 (e.g., a web-based application, standalone application, mobile application, etc.) of a customer device 1490. In some embodiments, at the provider network 1400, each virtual computing system 1492 at the customer network 1450 can correspond to a computation resource 1424 that is leased, rented, or otherwise provided to the customer network 1450.

From an instance of the virtual computing system(s) 1492 and/or another customer device 1490 (e.g., via console 1494), the customer can access the functionality of a storage service 1410, for example via the one or more APIs 1402, to access data from and store data to storage resources 1418A-1418N of a virtual data store 1416 (e.g., a folder or "bucket," a virtualized volume, a database, etc.) provided by the provider network 1400. In some embodiments, a virtualized data store gateway (not shown) can be provided at the customer network 1450 that can locally cache at least some data, for example frequently accessed or critical data, and that can communicate with the storage service 1410 via one or more communications channels to upload new or modified data from a local cache so that the primary store of data (the virtualized data store 1416) is maintained. In some embodiments, a user, via the virtual computing system 1492 and/or another customer device 1490, can mount and access virtual data store 1416 volumes via the storage service 1410 acting as a storage virtualization service, and these volumes can appear to the user as local (virtualized) storage 1498.

While not shown in FIG. 14, the virtualization service(s) can also be accessed from resource instances within the provider network 1400 via the API(s) 1402. For example, a customer, appliance service provider, or other entity can access a virtualization service from within a respective virtual network on the provider network 1400 via the API(s) 1402 to request allocation of one or more resource instances within the virtual network or within another virtual network.

Illustrative Systems

Figure 15:
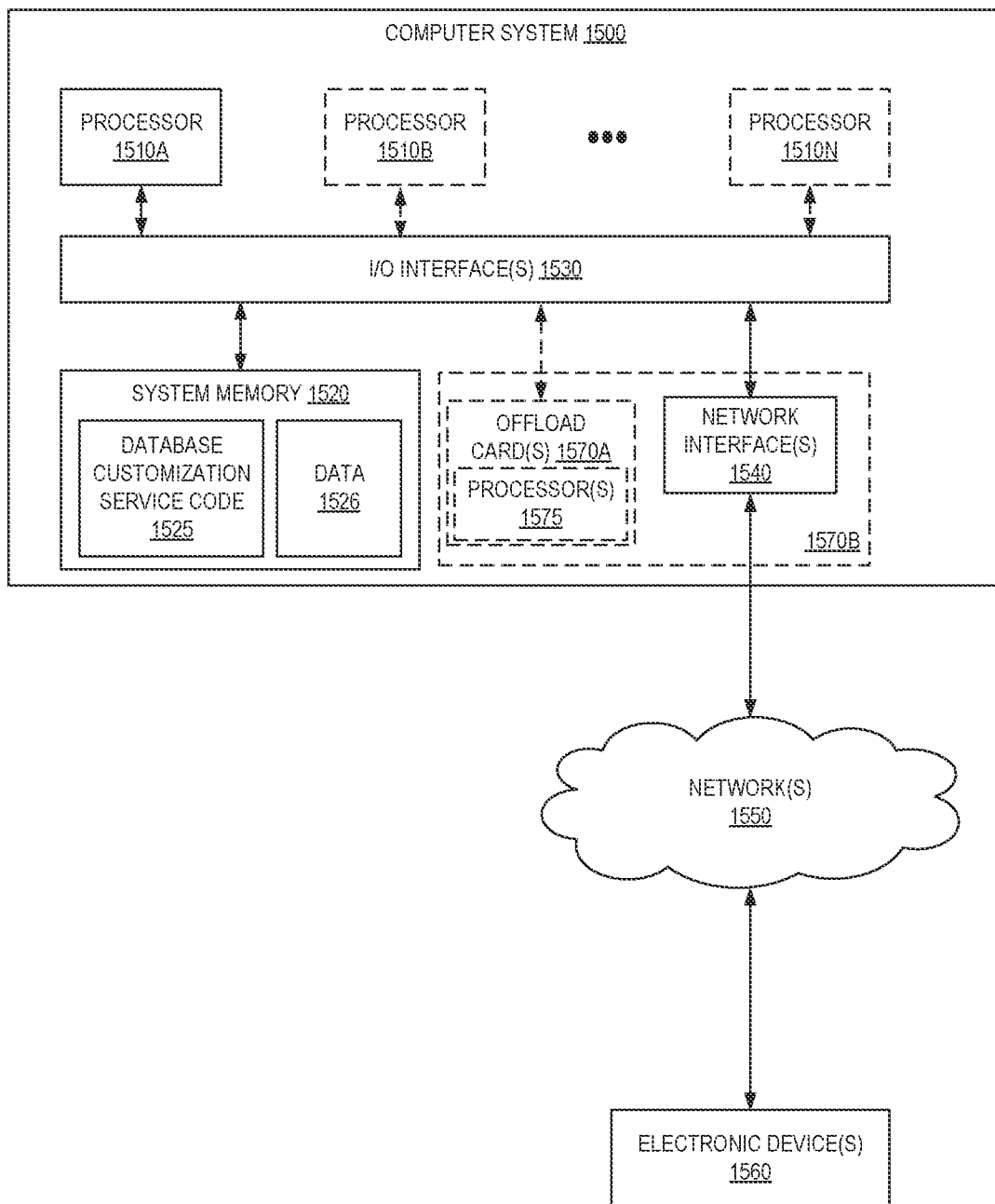
FIG. 15 is a block diagram illustrating an example computer system that can be used in some embodiments.

In some embodiments, a system that implements a portion or all of the techniques described herein can include a general-purpose computer system, such as the computer system 1500 illustrated in FIG. 15, that includes, or is configured to access, one or more computer-accessible media. In the illustrated embodiment, the computer system 1500 includes one or more processors 1510 coupled to a system memory 1520 via an input/output (I/O) interface 1530. The computer system 1500 further includes a network interface 1540 coupled to the I/O interface 1530. While FIG. 15 shows the computer system 1500 as a single computing device, in various embodiments the computer system 1500 can include one computing device or any number of computing devices configured to work together as a single computer system 1500.

In various embodiments, the computer system 1500 can be a uniprocessor system including one processor 1510, or a multiprocessor system including several processors 1510 (e.g., two, four, eight, or another suitable number). The processor(s) 1510 can be any suitable processor(s) capable of executing instructions. For example, in various embodiments, the processor(s) 1510 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1510 can commonly, but not necessarily, implement the same ISA.

The system memory 1520 can store instructions and data accessible by the processor(s) 1510. In various embodiments, the system memory 1520 can be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within the system memory 1520 as database customization service code 1525 (e.g., executable to implement, in whole or in part, the database customization service 108) and data 1526.

In some embodiments, the I/O interface 1530 can be configured to coordinate I/O traffic between the processor 1510, the system memory 1520, and any peripheral devices in the device, including the network interface 1540 and/or other peripheral interfaces (not shown). In some embodiments, the I/O interface 1530 can perform any necessary protocol, timing, or other data transformations to convert data signals from one component (e.g., the system memory 1520) into a format suitable for use by another component (e.g., the processor 1510). In some embodiments, the I/O interface 1530 can include support for devices attached through various types of peripheral buses, such as a variant of the Peripheral Component Interconnect (PCI) bus standard or the Universal Serial Bus (USB) standard, for example. In some embodiments, the function of the I/O interface 1530 can be split into two or more separate components, such as a north bridge and a south bridge, for example. Also, in some embodiments, some or all of the functionality of the I/O interface 1530, such as an interface to the system memory 1520, can be incorporated directly into the processor 1510.

The network interface 1540 can be configured to allow data to be exchanged between the computer system 1500 and other devices 1560 attached to a network or networks 1550, such as other computer systems or devices as illustrated in FIG. 1, for example. In various embodiments, the network interface 1540 can support communication via any suitable wired or wireless general data networks, such as types of Ethernet network, for example. Additionally, the network interface 1540 can support communication via telecommunications/telephony networks, such as analog voice networks or digital fiber communications networks, via storage area networks (SANs), such as Fibre Channel SANs, and/or via any other suitable type of network and/or protocol.

In some embodiments, the computer system 1500 includes one or more offload cards 1570A or 1570B (including one or more processors 1575, and possibly including the one or more network interfaces 1540) that are connected using the I/O interface 1530 (e.g., a bus implementing a version of the Peripheral Component Interconnect—Express (PCI-E) standard, or another interconnect such as a Quick-Path interconnect (QPI) or UltraPath interconnect (UPI)). For example, in some embodiments the computer system 1500 can act as a host electronic device (e.g., operating as part of a hardware virtualization service) that hosts compute resources such as compute instances, and the one or more offload cards 1570A or 1570B execute a virtualization manager that can manage compute instances that execute on the host electronic device. As an example, in some embodiments the offload card(s) 1570A or 1570B can perform compute instance management operations, such as pausing and/or un-pausing compute instances, launching and/or terminating compute instances, performing memory transfer/copying operations, etc. These management operations can, in some embodiments, be performed by the offload card(s) 1570A or 1570B in coordination with a hypervisor (e.g., upon a request from a hypervisor) that is executed by the other processors 1510A-1510N of the computer system 1500. However, in some embodiments the virtualization manager implemented by the offload card(s) 1570A or 1570B can accommodate requests from other entities (e.g., from compute instances themselves), and can not coordinate with (or service) any separate hypervisor.

In some embodiments, the system memory 1520 can be one embodiment of a computer-accessible medium configured to store program instructions and data as described above. However, in other embodiments, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 1500 via the I/O interface 1530. A non-transitory computer-accessible storage medium can also include any volatile or non-volatile media such as RAM (e.g., SDRAM, double data rate (DDR) SDRAM, SRAM, etc.), read only memory (ROM), etc., that can be included in some embodiments of the computer system 1500 as the system memory 1520 or another type of memory. Further, a computer-accessible medium can include transmission media or signals such as electrical, electromagnetic, or digital signals, conveyed via a communication medium such as a network and/or a wireless link, such as can be implemented via the network interface 1540.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments use at least one network that would be familiar to those skilled in the art for supporting communications using any of a variety of widely available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle(R), Microsoft(R), Sybase(R), IBM(R), etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments can be practiced without the specific details. Furthermore, well-known features can be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 1418A-1418N) can be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various embodiments.

References to "one embodiment," "an embodiment," "an example embodiment," etc., indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given embodiment requires at least one of A, at least one of B, and at least one of C to each be present.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

The specification and drawings are, accordingly, to be regarded in an illustrative rather than a restrictive sense. It will, however, be evident that various modifications and changes can be made thereunto without departing from the broader spirit and scope of the disclosure as set forth in the claims.

What is claimed is:

1. A computer-implemented method comprising:
   executing database customization service code on a computing device including a processor to implement a database customization service in a provider network;
   receiving, by the database customization service, input into the executing database customization service code of a policy specified by a first user to control the creation of custom database engine versions within the provider network by other users of a same organization as the first user and further to control the ongoing execution of database instances launched in the provider network based on the custom database engine versions;
   receiving, by the database customization service, input into the executing database customization service code of a request to create a custom database engine version, wherein the request was originated on behalf of a second user of the organization and identifies a configuration associated with a database engine;
   obtaining, from the executing database customization service code based on evaluating the policy, output of a determination that the configuration violates the policy; and
   denying, by the database customization service, the request to create the custom database engine version or notifying the first user or second user that the configuration violates the policy.

2. The computer-implemented method of claim 1, wherein the policy indicates that any database instance created based on the custom database engine version must utilize an operating system or database engine that satisfies a condition of the policy.

3. The computer-implemented method of claim 2, wherein the condition specifies that the operating system or database engine:
   is a version from a set of approved versions;
   has a feature enabled or disabled;
   is published by a vendor from a set of approved vendors;
   is open-source;
   has a license in a set of approved licenses;
   is patched with a designated patch or bug fix;
   does not have any known security vulnerabilities of a particular type or severity;
   is not missing any updates or patches of a particular type that have been made available within a threshold amount of time; or
   meets the requirements of a compliance program.

4. A computer-implemented method comprising:
   executing database customization service code on a computing device including a processor to implement a database customization service in a provider network;
   receiving, by the database customization service, input into the executing database customization service code of a policy specified by a first user to control the creation of custom database engine versions within the provider network;
   receiving, by the database customization service, input into the executing database customization service code of a request to create a custom database engine version, wherein the request was originated on behalf of a second user;
   obtaining, from the executing database customization service code, output of a determination that the custom database engine version violates the policy; and
   denying, by the database customization service, the request to create the custom database engine version or notifying the first user or second user that the custom database engine version violates the policy.

5. The computer-implemented method of claim 4, wherein the policy indicates that any database instance created based on the custom database engine version must have a feature enabled or must have the feature disabled.

6. The computer-implemented method of claim 4, wherein the policy indicates that any database instance created based on the custom database engine version must utilize an operating system or database engine that satisfies a condition of the policy.

7. The computer-implemented method of claim 6, wherein the condition specifies that the operating system or database engine:
   is a version from a set of approved versions;
   has a feature enabled or disabled;
   is published by a vendor from a set of approved vendors;
   has a license in a set of approved licenses;
   is patched with a designated patch;
   does not have any known security vulnerabilities of a particular type or severity;
   is not missing any updates or patches of a particular type that have been made available within a threshold amount of time; or
   meets the requirements of a compliance program.

8. The computer-implemented method of claim 4, wherein the policy is to further control the ongoing execution of database instances launched using the custom database engine version, and wherein the method further comprises:
   receiving a second request to create the custom database engine version, wherein the second request identifies an updated configuration;

creating the custom database engine version according to the updated configuration;

determining that a database instance that was launched based on use of the custom database engine version now violates the policy; and performing an action in response to the determination that the custom database engine version now violates the policy.

9. The computer-implemented method of claim 8, wherein the action comprises:

identifying an upgrade to the database instance that will make the database instance again become compliant with the policy; and scheduling the database instance to be upgraded according to the identified upgrade or providing a notification indicating an availability of the upgrade.

10. The computer-implemented method of claim 8, wherein the action comprises:

placing the database instance in a network quarantine, wherein while in the network quarantine at least some network connectivity of the database instance is eliminated or restricted; or terminating the database instance.

11. The computer-implemented method of claim 8, wherein the policy indicates that any executing database instance launched based on use of the custom database engine version is to be updated or patched within a threshold amount of time after the release of a particular type of update or patch.

12. The computer-implemented method of claim 8, wherein the database instance violates the policy due to one of:

a change to an aspect of the policy;

a new security vulnerability being published that affects the database instance; or a severity score of an existing security vulnerability is changed to a new value that causes the database instance to now violate the policy.

13. The computer-implemented method of claim 8, wherein the database instance executes within an on-premise environment of an organization that is distinct from the provider network.

14. The computer-implemented method of claim 8, wherein the database instance executes in a self-managed manner via a hardware virtualization service of the provider network.

15. A system comprising:

a first one or more electronic devices to host database instances in a multi-tenant provider network; and a second one or more electronic devices to implement a database customization service in the multi-tenant provider network, the database customization service executing database customization service code using a processor to cause the database customization service to:

receive input into the executing database customization service code of a policy specified by a first user to control the creation of custom database engine versions within the multi-tenant provider network;

receive input into the executing database customization service code of a request to create a custom database engine version, wherein the request was originated on behalf of a second user of the multi-tenant provider network;

obtain output from the executing database customization service code of a determination that the custom database engine version violates the policy; and deny the request to create the custom database engine version or notify the first user or second user that the custom database engine version violates the policy.

16. The system of claim 15, wherein the policy indicates that any database instance created based on the custom database engine version must have a feature enabled or must have the feature disabled.

17. The system of claim 15, wherein the policy indicates that any database instance created based on the custom database engine version utilizes an operating system or database engine that satisfies a condition of the policy.

18. The system of claim 17, wherein the condition specifies that the operating system or database engine:

is published by a vendor from a set of approved vendors;

is open-source;

has a license in a set of approved licenses;

is patched with a designated patch; or does not have any known security vulnerabilities of a particular type or severity.

19. The system of claim 15, wherein the database customization service is further to:

receive a second request to create the custom database engine version, wherein the second request identifies an updated configuration;

create the custom database engine version according to the updated configuration;

determine that a database instance that was launched based on use of the custom database engine version now violates the policy; and perform an action in response.

20. The system of claim 19, wherein the action comprises one of:

identifying and scheduling an upgrade to the database instance that will make the database instance again become compliant with the policy;

placing the database instance in a network quarantine, wherein while in the network quarantine at least some network connectivity of the database instance is eliminated or restricted; or terminating the database instance.

* * * * *